United States Patent
Gandhi et al.

(10) Patent No.: US 8,199,359 B2
(45) Date of Patent: Jun. 12, 2012

(54) SYSTEM AND METHOD FOR REDUCING VISIBILITY OF REGISTRATION ERRORS IN AN IMAGE TO BE PRINTED USING A DIGITAL COLOR PRINTER BY CONVOLUTION WITH A LAPLACIAN KERNEL

(75) Inventors: Lakhbir Gandhi, Auburn, WA (US); Robert Westervelt, Los Angeles, CA (US); Kenneth A. Schmidt, Redondo Beach, CA (US); Dongpei Su, Lomita, CA (US); Alfred Abkarian, La Crescenta, CA (US); Mark Raley, Torrance, CA (US)

(73) Assignee: Kyocera Mita Corporation, Osaka (JP)

( * ) Notice: Subject to any disclaimer, the term of this patent is extended or adjusted under 35 U.S.C. 154(b) by 880 days.

(21) Appl. No.: 11/789,206

(22) Filed: Apr. 24, 2007

(65) Prior Publication Data

US 2008/0007752 A1  Jan. 10, 2008

Related U.S. Application Data

(60) Provisional application No. 60/795,901, filed on Apr. 28, 2006.

(51) Int. Cl.
*G06F 15/00* (2006.01)
(52) U.S. Cl. ........................................ 358/1.9
(58) Field of Classification Search ............... 358/1.9
See application file for complete search history.

(56) References Cited

U.S. PATENT DOCUMENTS

| | | | |
|---|---|---|---|
| 5,481,379 A | 1/1996 | Yosefi | |
| 5,581,667 A * | 12/1996 | Bloomberg | 358/1.9 |
| 6,549,303 B1 | 4/2003 | Trask | |
| 6,970,271 B1 | 11/2005 | Estrada et al. | |
| 2001/0055130 A1 | 12/2001 | Geurts et al. | |
| 2002/0167526 A1 | 11/2002 | Kinoshita | |
| 2003/0044065 A1 | 3/2003 | Harrington | |
| 2003/0142314 A1 | 7/2003 | Hubble, III et al. | |
| 2003/0197877 A1 | 10/2003 | Lee | |
| 2004/0095590 A1 | 5/2004 | Megawa et al. | |
| 2004/0212628 A1 | 10/2004 | Becker et al. | |
| 2004/0263834 A1 | 12/2004 | Alumot et al. | |
| 2005/0168644 A1 | 8/2005 | Demas et al. | |
| 2005/0219631 A1 | 10/2005 | Accad et al. | |

FOREIGN PATENT DOCUMENTS

EP   0 996 282 A2   4/2000

* cited by examiner

*Primary Examiner* — Benny Q Tieu
*Assistant Examiner* — Qian Yang
(74) *Attorney, Agent, or Firm* — Blakely, Sokoloff, Taylor & Zafman

(57) ABSTRACT

A system and method for trapping in electrophotographic color printing and related technologies for printing or display in which the final image is an overlay of multiple components subject to alignment errors. Trapping is based on the cyan (C), magenta (M), and black (K) planes. There are four steps as follows: detect object edges on each of the four color planes; detect coincident and opposing edge transitions on each pair of planes (CM, CK, and KM); determine which plane to trap, i.e., to extend object across edge; and generate trap on that plane using a simple trap generation rule and a single trap generation rule.

10 Claims, 24 Drawing Sheets

| 0  | +1 | 0  |
|----|----|----|
| +1 | -4 | +1 |
| 0  | +1 | 0  |

Figure 2

| +1 | +1 | +1 |
|----|----|----|
| +1 | -8 | +1 |
| +1 | +1 | +1 |

Figure 3

| 20 | 123 | 123 | 123 | 123 |
|----|-----|-----|-----|-----|
| 20 | 20  | 123 | 123 | 123 |
| 20 | 20  | 20  | 123 | 123 |
| 20 | 20  | 20  | 20  | 123 |

Figure 4

| 0*20 | 1*123 | 0*123 | 123 | 123 |
|---|---|---|---|---|
| 1*20 | -4*20 | 1*123 | 123 | 123 |
| 0*20 | 1*20 | 0*20 | 123 | 123 |
| 20 | 20 | 20 | 20 | 123 |

Figure 5

| 206 | -206 | 0 | 0 | 0 |
|---|---|---|---|---|
| 0 | 206 | -206 | 0 | 0 |
| 0 | 0 | 206 | -206 | 0 |
| 0 | 0 | 0 | 206 | -206 |

Figure 6

TRAPPING SOFTWARE PROCESSES EDGES
BETWEEN CENTERS OF CONVOLUTION MATRICES,
AND MOVES COLORS ACROSS EDGES

HARDWARE IMPLEMENTATION MUST
CONSIDER ALL UPDATES
TO AN OUTPUT PIXEL FROM ANY DIRECTION.

KEY: ⊙ Current pixel being processed    ⌐ Current edge being processed    ⌐ Marker for convolution matrix

SYSTEM AND METHOD FOR REDUCING VISIBILITY OF REGISTRATION ERRORS IN AN IMAGE TO BE PRINTED USING A DIGITAL COLOR PRINTER BY CONVOLUTION WITH A LAPLACIAN KERNEL

CROSS REFERENCE TO RELATED APPLICATIONS

This application claims priority from U.S. Provisional Application Ser. No. 60/795,901, filed on Apr. 28, 2006, which is incorporated herein by reference in its entirety.

FIELD

The present invention applies to color printing by electrophotographic technology in which the final print consists of an overlay of multiple impressions. For example, using impressions in the colors cyan, magenta, yellow and black respectively, a visual equivalent of a full color view can be printed. In principle, it also applies to any electronic digital method for printing or display in which the final print or image consists of more than one print plane component or image plane component where the components overlaid are not perfectly in register and the visibility of the errors can be reduced by a technique known as trapping.

BACKGROUND

In the terminology of traditional printing the term trapping (more particularly wet trapping and dry trapping) is believed to have been applied first to the press technique of overprinting on a previously printed page. Such a technique has been widely used to produce color prints by printing different color impressions in succession on the same sheet. Print technologies that layer multiple colorants in this way are sensitive to mechanical positioning errors. The different color layers must be almost perfectly aligned, or registered, over the whole sheet for good results. A relative lateral misalignment even as small as a fraction of a pixel in a digital system, or its equivalent in traditional printing, will usually be visible as undesired gaps or overlaps at the edges of printed shapes where colors change and involve different layers. Gaps that reveal a white or light-colored substrate are the most visible and objectionable. Overlaps are also visible, but not nearly as objectionable. Because sufficiently precise alignment is seldom practical, various pre-press techniques have been developed to close the gaps by creating at the pre-press stage small overlaps between abutting colors to mask registration problems in the printing process itself. The essentials of the pre-press technique are known as spreading and choking and collectively called trapping. In view of the potential ambiguity, the subject of this invention is trapping in the pre-press context in order to reduce the visibility of misregistration artifacts.

The best visual forms for changes to the image to be printed have been learned over the years, mostly in the traditional printing industry, and codified into a set of rules. In traditional printing, implementation of the rules required knowledge and craftsmanship, but because they are systematic and thorough they have proved suitable for automatic implementation in contemporary digital printing systems. However, they are not simple, they do not completely address all practical cases and their interaction with other digital image path processes presents particular difficulties further compounded by the challenges of inexpensive and efficient implementation.

FIG. 1 is a general diagram of a digital printing system consisting of a personal computer 1a that can communicate with a color printing device comprised of a device controller 1b and a color marking mechanism 1c. The device controller 1b accepts document data to be printed, delivers raster image data to the color marking mechanism and provides control functions. The color marking mechanism prints the raster images on plain paper or other suitable physical media. Imperfections in the mechanism may give rise to color registration artifacts which can be ameliorated by trapping.

SUMMARY OF THE INVENTION

The invention describes a system for trapping in electrophotographic color printing and related technologies for printing or display in which the final image is an overlay of multiple components subject to alignment errors. Trapping is a technique, well-known in principle, for reducing the visibility of alignment errors, also known as registration errors, by selectively adjusting the boundaries of image objects to overlap slightly and thereby conceal the errors. In the present invention the new methods apply to digital systems, especially to electrophotographic color printers in desktop publishing systems. The new methods offer improvements in simplicity of implementation, performance, cost, customization, compatibility with color printer controllers, automatic operation and visually acceptable results.

The present invention provides effective methods for implementation in digital systems by means of software and hardware described below. In order to understand the present invention, and the improvements it offers relative to previous methods, we begin with the underlying rules, which are addressed in the present invention and which will be recognized by most practitioners. The following trapping rules determine whether to create a trap at a color boundary and, if so, what the characteristics of the trap should be.

When and How to Trap

Whenever two colored objects abut each other or an object is overlaid on top of another, an edge is formed where the two meet. This edge is where trapping may occur. Given that the color of an object is comprised of one or more primary colorants from a respective impression or impressions, each constituent colorant is considered individually as a candidate for trapping. Thus the neutral density of each of the colorants and not the specific color of the object is used to determine whether to create a trap for that colorant. If the absolute difference in neutral density between objects, for the same colorant, exceeds a certain threshold (usually about 5%) then the colorant at that edge becomes a candidate for trapping. Another test, known as a relative mode threshold, is also sometimes applied. In relative mode, if the ratio of the difference in neutral densities to that of the colorant with lower value exceeds a threshold (say 50%), then the colorant at that edge becomes a candidate for trapping. However, because this mode takes effect at low color density levels, it rarely provides perceptible quality improvement and it may be omitted where performance and cost take priority.

The shapes of the objects as well as properties of the colorants of the objects that produce the color edge are factored into the decision to trap. As discussed below, photographic images and color gradients (also called blends, smooth shading or vignettes) have their own rules for trapping. Generally the trap is produced by adjusting the boundary of the lighter colorant into the darker colorant. Thus if there is a lighter colored object on top of a darker background, then the object is 'spread' into the background. Conversely, in the case of a darker object against a lighter background, the background 'chokes' into the object. The trap property of spreading or choking is called the trap direction. In the case of two colored objects that are very close to each but do not meet it may be necessary to establish by experiment with a particular system whether they should be subjected to trapping. Two objects separated by a pixel or two will produce a more-or-less visible white line along the edge and it is a circumstantial matter whether the line will be perceived as intentional or as an artifact. Establishing the width and the exact color of the trap are also critical for producing traps with low visible artifacts. The thinner the trap the less visible it will be; its width should therefore be no more than the maximum misregistration to be addressed, which is a characteristic of the printing device. Ordinarily the color of the trap is the same as that of the lighter colored object, but as discussed below its intensity may be reduced to minimize the visibility of the trap.

When Not to Trap

When color objects are separated by significant white space or if one of the colorants has a low neutral density, then trapping is not necessary. Also, since in many CMYK (for cyan, magenta, yellow, black) printing processes yellow has a low neutral density, it need not then be taken into consideration for trapping decisions. In another case, when the two adjacent colors share a significant amount of the same primary color component, it is not necessary to trap. In all other cases, the color edge needs to be trapped.

Colorant Type

The type of the colorant used is important for trapping decisions. For example, translucent colorants use normal trapping rules; opaque colorants may never be spread into other colorants when trapping; transparent colorants may require they not be subject to trapping, etc. For the typical color electrophotographic printer, the color process is CMYK; the cyan and magenta toners are considered to be translucent; yellow is not taken into account in deciding where to trap and black is considered to be opaque.

Images

Trapping within photographic images can produce unwanted artifacts, so photographic images should normally not be trapped. However sometimes it may become necessary to do so when the photographic image contains saturated colors such as scanned logos and images generated from non-photographic sources. The manner in which color edges adjacent to images are trapped also affects visual quality. Using normal trapping rules can cause abrupt transitions in the trap direction. Generally the choices are to trap by extending the adjacent color into the image, or the image colors into the adjacent color, or to center a trap along the edge of the image and the color being trapped, depending on image and print system characteristics.

Color Gradients

Also known as smooth shading, blends or vignettes, gradients cause particular problems. First, the trapping is not appropriate inside a color gradient since that has the potential to highlight color changes within the gradient which is counter to the intent of a smooth transition from one color to another. The present invention avoids such missteps through application of the edge detection threshold which removes edges from consideration for trapping when the color changes gradually as is the case inside color gradients.

Black

Color edges adjacent to black areas are always trapped by spreading the colorant into the black region and never by spreading the black object regardless of the intensity of the black. In addition black rules can also apply to some colorants that have a certain minimum neutral density.

Pure Black, Process Black and Rich or Super Black

A pure black object is printed with only black colorant. The dark color produced by overprinting only the other colorants at maximum density is usually known as process black. In offset printing, rich or super black consisting of an overprint of pure black and process black with all colorants at full density is quite common, but it is not used in electrophotographic printing with CMYK colorants because the printing process imposes a much lower limit on the sum total of colorant densities. Thus, in electrographic printing different concepts apply in that objects specified in a page description language (PDL) as process black or super black may, as a result of digital color processing, be printed using all four toners but with the K colorant much lower in value than full density because of the total colorant limit. Therefore in the present invention, both process black and super black will be encompassed by the term super black and the one trapping rule is applied to both.

If there is misalignment of color planes, super black objects will have a cyan or magenta halo around them, especially if the background is light colored or white, or vice-versa (light colored object on super black background).

Yellow Trapping Rule

If the value of the yellow colorant on the side of the edge that generates the trap is high, then the trap will be visible as a light colored halo around the edge. To avoid this effect, whenever a trap is calculated, the yellow colorant is also copied along with the other colorants. This prevents the halo from showing up. An example is a black object on a green background comprised of 100% cyan and 100% yellow—in this case the cyan background will choke into the black object. If there is a misalignment, then the area of the cyan trap that is uncovered by the black object will show up as a blue halo to the naked eye. This is avoided if the yellow in the green color is also choked into the black object. In this case, the color of the trap is green and not cyan.

Simple and Single Trap Generation Rules

Under the basic trap generation rule, described in detail below and known in the present invention as simple trap generation, any two colorants other than yellow changing across the color edge in opposite directions are trapped, which can result in traps from one or two of the three colorants. Thus it can generate more than one trap per edge, either on the same side of the edge or on both sides. A second rule, described in detail below and known in the present invention as single trap generation, is used when application of the simple rule indicates that an edge will generate two traps on both sides of a color edge. In this case, the lighter of the two traps is discarded and the darker trap is used to generate the final trap.

Spot Colors

Prepress software for conventional printing generally provides support for trapping to a number of spot colorants, but spot color handling is seldom applicable to digital printers using the CMYK process and it is not addressed in the present invention.

Corners, Trap Ends, Trap Intersections, Thin Sections and Small Elements

Under some conditions and for relatively large misregistrations and traps, image elements with sharp corners, thin sections and small features, also trap ends and intersections, all may require special treatment to reduce objectionable visual artifacts. In the present invention and for traps up to two pixels wide no such artifacts are visible. Therefore the merits of high performance and low cost are preserved by not providing special treatment in these cases.

Implementation of the Trapping Rules

In their application to color printing, the trapping rules require selective modification of the color separations. Contemporary color printing workflows are generally digital and they vary in detail, but the key well-known and common steps useful for understanding the present invention are document composition and raster image processing. Trapping can be accomplished in either step.

Composition is performed with a publishing application and trapping accomplished at this stage is known as application-level trapping. In application-level trapping, the traps are created by the application itself such as Adobe Illustrator, while the page to be printed is in the native application format, or by an application written specifically to generate traps from the representation of the page in a well-known page description language (PDL) such as PDF or PostScript. This kind of trapping is semi-automatic in the sense that the user has explicitly to include a trapping step in the workflow, but the application can then analyze the page and generate the traps. Application level trapping has the advantages that the user can apply any special trapping required by the printing or display process, and some feedback in the form of a preview and trapping progress indicator can be provided. However it has the disadvantage that it can produce unintended results because information of the physical properties of the printing device and colorants may not be available when the traps are being generated. Editability of trapped pages is reduced because the user has to manage the trapping marks if a change is made to the page. The present invention does not perform application-level trapping.

Raster image processing is performed with a Raster Image Processor (RIP) which accepts the representation of the page in PDL format and from it generates image rasters acceptable to the printing or display device. Trapping accomplished at this stage is known as in-RIP trapping. It has the advantage of creating the most accurate traps because all the pertinent information about the device and the colorants is available. Since trapping is the last stage of modification in the workflow, there is minimal interference with any other step.

As is well known, in the PDL datastream supplied to the RIP the digital image format is a vector or object representation; in the output to the device it is a raster format. In-RIP trapping, in turn, can be accomplished at either of these levels or in a hybrid combination. The traps can be calculated as the page description lays down each object on the raster or alternatively the entire page can be rasterized before any trapping is performed. The former case, known as object-based trapping, has the advantages that object type can be taken into account to handle complex trapping rules and performance is favored because object information such as the path and color of the entire outline are available and do not have to be calculated. Object-based trapping has the disadvantages that it is complicated in cases where several objects are overlaid on top of each other and transparent objects need to be 'flattened' (a process in which the final color of transparent objects is determined by applying the transparency value to the color of the transparent object and to the color of the background) before any trapping can be performed on them. Also, it can conveniently be implemented only in software, unfavorably impacting RIP performance.

The case in which the page is rasterized completely before trapping begins is known as raster-based trapping. In this case, each pixel is analyzed along with its neighbors in its plane and in the other color planes to calculate the traps. This has the advantage of decoupling the trapping process from the rasterizing process and it allows incorporation into a program library or even into an ASIC for a hardware solution. The disadvantages are that object information can be lost and a performance penalty may be incurred through having to address each pixel at least twice in the process, first when the pixel is rasterized and second when it is trapped. Performance problems can be mitigated by incorporating trapping into an ASIC or by integrating it into other steps in the page pipeline process such as black generation, tag bit generation, etc.

In addition, a hybrid approach with features and methods of both cases can be designed that retains after rasterization some object information which can be used to facilitate raster based trapping.

Implementation and Operation

Trapping is based on the cyan (C), magenta (M), and black (K) planes. There are four steps:
1. Detect object edges
2. Detect coincident and opposing edge transitions on each pair of planes (CM, CK, and KM)
3. Determine which plane to trap (to extend object across edge)
4. Generate trap on that plane Edges are detected by measuring spatial rates of change of color value and comparing the color values across the edges against several thresholds. Once the edges in a page raster have been identified, the information in the edge data and in the original color plane is used to perform the actual trap calculations. The output of the trap calculations identifies the color plane or planes that should be trapped and the direction in which the trap should be generated. Traps are generated by using input from the trap calculations and performing a morphological operation as simple as copying the value of the pixel from one side of the color edge to the neighboring pixel on the other side of the color edge, or two pixels across and perpendicular to the color edge or a more complex operation such as a gray level dilation operation.

In its application to printing with color electrographic printers, the invention requires as input raster data for the color planes either for each plane separately or in packed form with data for all colors for each pixel. Thus, for example in the case of four colors CMYK, in planar form the data would be organized into four arrays of pixels and in packed form it would be as a single array with each element representing all four color values for one pixel. In one possible realization the invention is implemented in ISO C++. It is a layered architecture that allows pluggable and interchangeable components in the form of templatized classes that can be combined by means of the C++ template mechanism to generate the code for a complete trapper. Trapping is a computationally intensive process, and since the characteristics of electrographic printers vary greatly, it must be able to handle a wide variety of real world situations. This goal conflicts directly with those of trapping in real time with high performance and low cost. Therefore a hybrid approach has been utilized that capitalizes on the expressivity of C++ templates and operator overloading as well as the terse and fast assembly code generated by C code, resulting in a flexible architecture that does not compromise on speed and cost.

The present invention can be implemented as a raster-based trapping system and as a hybrid system. It operates on multi-bit per pixel raster data. Other information about the content of the page raster or the source of graphic elements that comprise the page is not essential, i.e. whether graphic elements are derived from photographic images, are color gradients, text glyphs or geometrical shapes. However, if in the image data available to the invention image objects that are photographs are identified as such, the information can be used to adjust trap thresholds.

The present invention can be implemented as an application-level trapper or as an in-RIP trapper in the printer. When implemented in a printer it does not conveniently provide a preview but as application-level software it can do so.

BRIEF DESCRIPTION OF THE DRAWINGS

FIGS. 2 and 3 show a Laplacian kernel as an array of weights applied to a corresponding region of pixels for the purpose of performing a convolution calculation on an image array.

FIG. 4. shows an example of an array of pixel values in an image.

FIG. 5 illustrates the process of convolving the sample color plane shown in FIG. 4 with the Laplacian kernel (1-4) shown in FIG. 2.

FIG. 6 shows the result of the example convolution process, a convolved plane.

DETAILED DESCRIPTION OF THE INVENTION

Object Edge Detection

Figure 1:
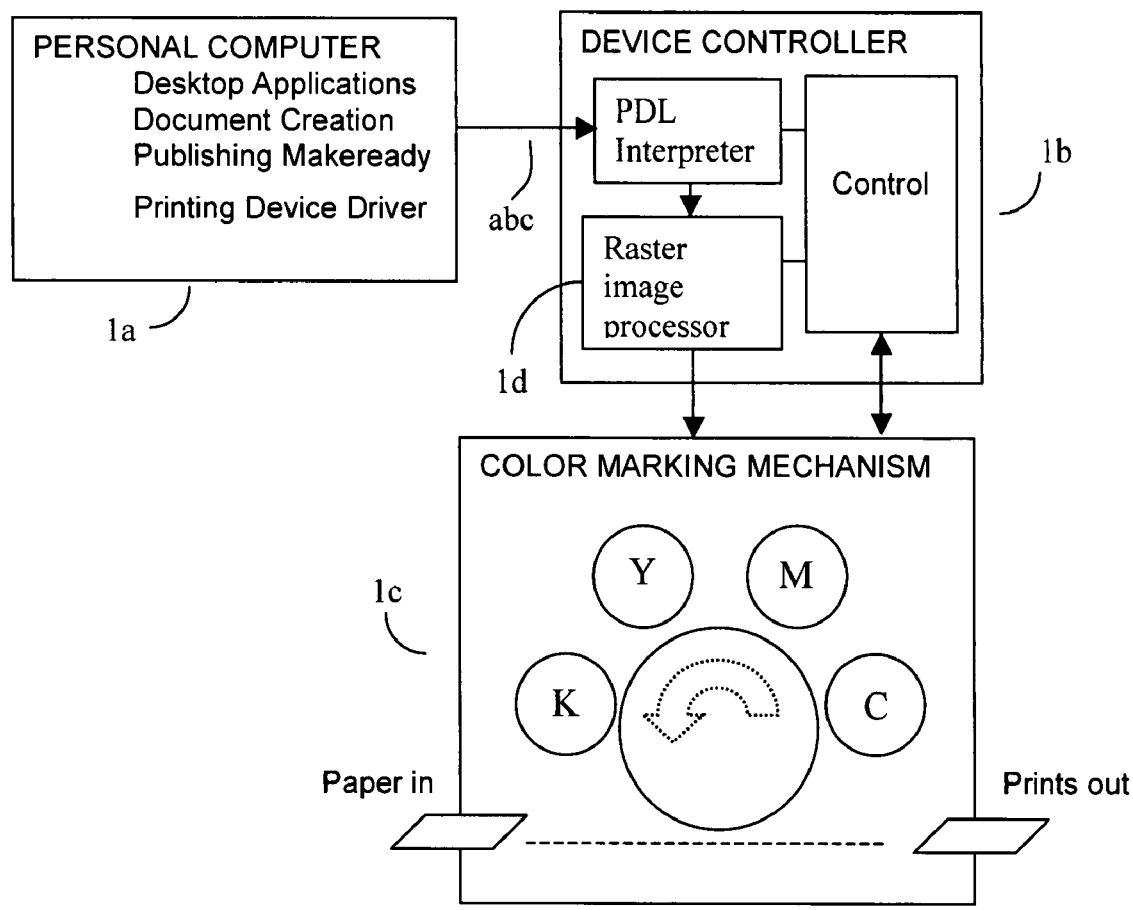
FIG. 1 is a block diagram of a digital printing system consisting of a personal computer that can communicate with a color printing device.

Object edge detection is performed on each color plane independent of other color planes. The well-known method of convolution with a so-called Laplacian kernel is used for each pixel in the color plane. The result can be thought of as, in effect, a new plane of convolved values whose dimensions correspond pixel-for-pixel with the original plane. For efficiency and resource reasons in a practical software implementation for trap widths up to one pixel only three scanlines are convolved at a time. This three scanline window starts at the top of the page raster image and moves downwards to the bottom of the page one scanline at a time as each scanline is trapped. For trap widths up to two pixels, five scanlines are used in the same way. In practical hardware, convolutions are calculated, but they are not saved to a "new plane." Thus a vertical "swath" of five convolution values (for 1.5 and 2.0-pixel traps) is generated in a hardware pipeline.

The Laplacian kernel is an array of weights applied to a corresponding region of pixels for the purpose of performing a convolution calculation on an image array. The center element of the kernel is used to multiply the value of a pixel which is the current subject of the convolution calculation. The other elements are used to multiply the values of the corresponding pixels immediately adjacent to the current pixel. The sum of the products is the value of a new element in a new array created by the convolution process. Laplacian kernel (1-4) shown in FIG. 2 and Laplacian Kernel (1-8) shown in FIG. 3 are well-known kernels that may be used in the present invention.

Convolution is the process of adding the weighted values of the pixel in question and its neighboring pixels. The weights are generally composed of a 3×3 matrix such as the well-known examples shown in FIG. 2, Laplacian kernel (1-4), and FIG. 3, Laplacian kernel (1-8). The center of the kernel coincides with the pixel whose convolved value is to be determined. Convolution with the Laplacian kernel creates, in effect, an array approximating the $2^{nd}$ order spatial differential of the page image. The convolved values possess some unique characteristics which we utilize to detect edges. The convolved value is zero when the color value does not change from pixel to pixel; it peaks positively on one side of the color edge when the color value increases on the other side of the color edge and it peaks negatively on that other side, effectively crossing zero at precisely the location of the color edge. The magnitude of the convolved value depends upon the difference in the pixel values across the color edge and it is greater if the pixels change color abruptly and lower (but finite nevertheless) in the case of gradual changes in pixel value as would be the case in color gradients. By testing the convolved value against a threshold, edges detected within color gradients for which the convolved value would be low can be completely eliminated and, to a lesser extent but effectively nevertheless, so can edges within images which have a photographic origin.

The direction of the color change is encoded in the signs of the convolved values. Thus if the color value increases from left to right on a vertical edge, then the convolved value will be positive to the left of the edge and negative to the right. Conversely if the color value decreases from left to right on a vertical edge, then the convolved value will be negative to the left of the edge and positive to the right of the edge. This information is used when applying the trapping rules.

The 1-4 Kernel is preferred to the 1-8 kernel because it has been found to be to be more sensitive to diagonal edges. Also, because some weights are 0 the corresponding pixels need not be taken into account, thus enabling higher performance. With the 1-4 kernel convolved values range from −1020 to +1020.

Since each color plane is convolved separately, an example of a portion of a single plane is shown in FIG. 4, "Sample color plane 1". Here a diagonal edge progresses from the top left to the bottom right of the image.

FIG. 4. is an example of an array of pixel values in an image. The pixel values may range from 0 to 255 representing lightest to darkest respectively. Thus in this example there is a sharp transition from lighter to darker between pixels with value 20 and those with value 123. Such a transition is an edge.

In FIG. 4, "Sample color plane"; if we consider the top left as the origin (0, 0), then to convolve the pixel at coordinate (1, 1) we apply the weights as shown and add them, storing the result in the convolved plane (not the original plane) at pixel location (1, 1). As explained below, the result in this case will be a unit less numeric value +206. Note that convolution generates positive and negative integers; also it will be understood that care should be taken to ensure the data type used to hold the convolved value has enough precision to avoid overflows. In the case of 8 bit contone data, the range of convolved values generated can be between −1020 & +1020, so an 11-bit register is required.

FIG. 5 illustrates the process of convolving the sample color plane shown in FIG. 4 with the Laplacian kernel (1-4) shown in FIG. 2. The overlay is shown for the second pixel in the second row and the result for the corresponding value in the convolved plane is the sum of the products of the respective pixel values and kernel terms, namely 0+123+0+20−80+123+0+20+0=206. Equivalent overlays and summations are performed for all pixels in the color plane. FIG. 5 illustrates the process of convolving the sample color plane shown in FIG. 4 with the Laplacian kernel (1-4) shown in FIG. 2. To execute the convolution of the overlay, multiplication and summation steps are performed for every pixel in the color plane.

Convolution by Partial Registers

Convolution processing applies to every pixel in a page raster and there is a very large number of pixels in a high-quality image. Therefore convolution is a CPU- and memory bus-intensive process and software optimization techniques are useful in practice. Consider the convolution of an image performed by the following Laplacian kernel:

$$R=A+C+D+E-4*B \qquad \text{function \#1}$$

Where A through E are 8-bit unsigned pixel values and the result is denoted by R. Also consider the generally available execution units of a contemporary example superscalar processor namely a load/store unit and two arithmetic logic units (ALUs), and how the above function can be scheduled to execute on such a processor given that the execution units are capable of simultaneous parallel operation. Such work can be scheduled in 4 CPU cycles on the superscalar processor that is capable of executing a load or a store in 1 cycle but with a latency of 2 cycles. Given first and second ALUs, the actual calculation can be performed in 3 cycles with a one cycle stall in the second ALU. Both ALUs then stall for one cycle for lack of data. The values used in this calculation would have been loaded into scratch registers during the previous 4 cycles, and while calculating the R value for the data thus previously loaded the values for the next 4 cycles would be loaded. This 'time shifting' of calculations tends to eliminate processor stalls caused by data dependencies. While there are five inputs to the equation only three new values (e.g. C,D,E) need be loaded per four-cycle iteration because two values can be reused from the previous four-cycle iteration (e.g. A, B).

To further optimize the execution of function #1 certain observations are useful. The unsigned pixel values are constrained to between −1020 and 1020. As each register in the superscalar processor has a word width of 32 bits, many bits remain unused as long as R neither overflows nor goes negative. Overflow is impossible given the pixel value range constraint, and R can be prevented from going negative by modifying function #1 thus:

$$R+1020=1020+A+C+D+E-4*B \qquad \text{function \#2}$$

Function #2 can always be performed in 11 bits (0-2040). Each register can then be logically divided into partial registers (bit fields) and more than one calculation can be performed simultaneously. To convolve by partial registers each data load becomes a word (32 bit) load where each input value (A, B, C, D, E) is 16-bit aligned instead of 8-bit aligned. 16-bit alignment is used rather than 11 bits since it is the next power of 2 up from 11. There are therefore two pixels represented in each word. These paired loads are then fed directly to the ALUs resulting in an R value which contains two separate convolution results. The user of R then need only subtract 1024 from each 16 bit field to obtain a signed value. Since R is often used for relative comparisons this subtraction may not even be necessary.

It will be understood that such parallel processing can be used with superscalar processors having numbers of ALUs and word widths that differ from the example superscalar processor.

FIG. 6 shows the result of the example convolution process, a convolved plane. Implicit in this figure is an assumption that the edge illustrated in FIG. 4 extends along the same line for at least one set of pixels to the upper left and at least one set of pixels to the lower right of the portion of the sample color plane shown in FIG. 4.

After all the pixels in the input plane have been convolved, the convolved plane contains the values shown in FIG. 6, "convolved plane". Note that the values are 0 where the color does not change in the original plane, but peak positively and negatively across the precise locations where the color value transitions from 20 to 123. By this means all the color edges in the input plane can be found.

The convolved value is important also because its absolute value encodes the rate at which the color value changed. The previous simple example does not illustrate this point, but when color gradients and more complex color changes such as in photographic images are introduced, the convolved value can be thresholded to eliminate small differences in color from pixel to pixel. Thresholding is a point process and the result is +1 or −1.

Detect Coincident and Opposing Edge, Determine which Plane to Trap, Generate Trap Now that the positions of the edges are known, the color values of the Cyan, Magenta & Black planes across both sides of the color edge are used as well as the direction of the edge to generate traps. Assume a vertical color edge, which would mean the color change in the pixels is horizontally across the edge; denote the pixel values of the Cyan Magenta & Black planes on the left side of the edge as $C_L$, $M_L$ & $K_L$; similarly call the color values on the right hand side of the edge for the three color planes $C_R$, $M_R$ & $K_R$ respectively. Note that it is here that the Relative Toner Density Lookup Tables will be used.

Figure 7:
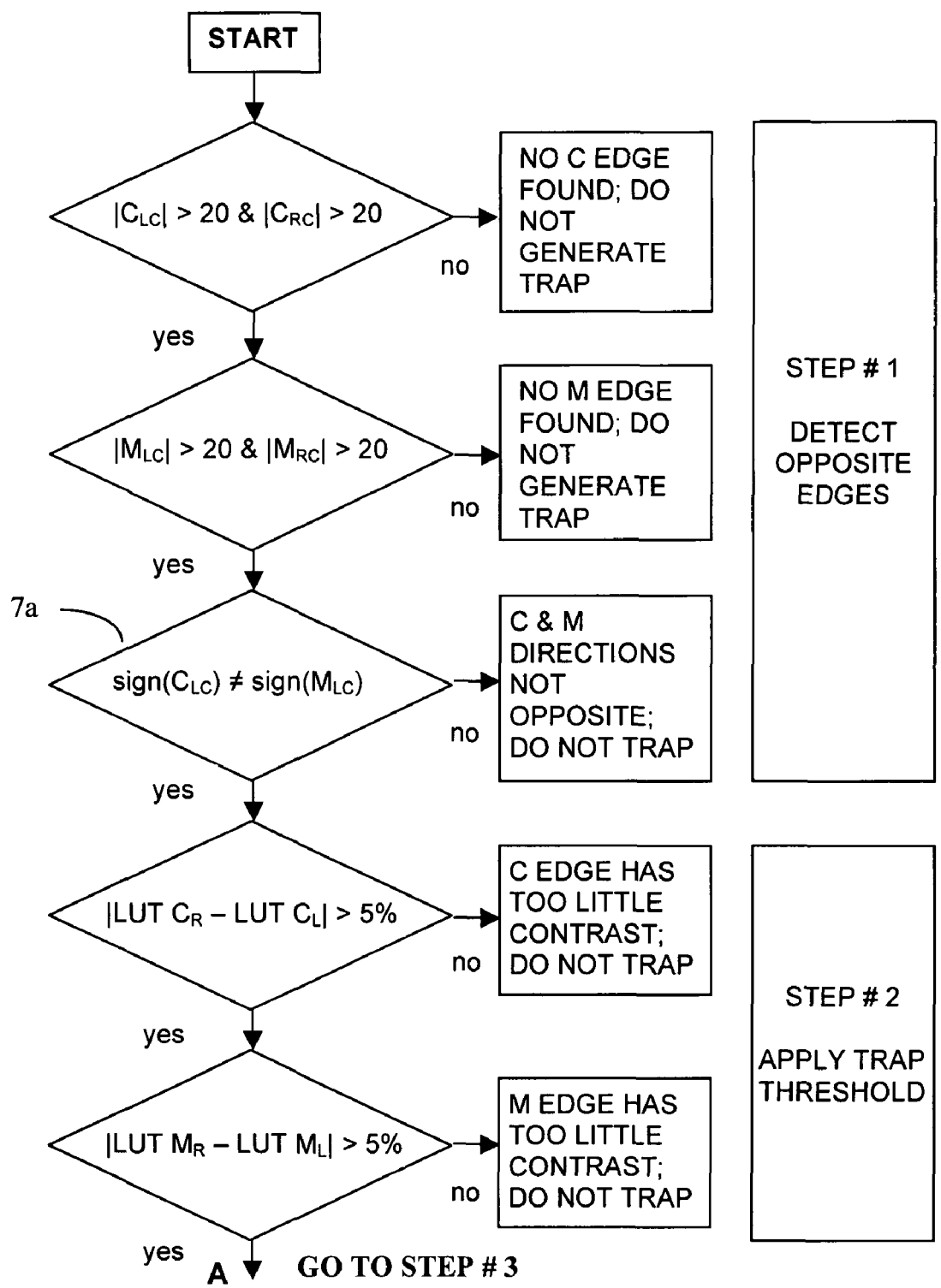
FIG. 7 is a flow diagram for steps 1 and 2 of simple trap generation for cyan and magenta planes.

FIG. 7 shows the flow diagram for steps 1 and 2 of simple trap generation for cyan and magenta planes. $C_L$ and $C_R$ are the pixel values on the left and right sides of the edge respectively for the cyan plane. $C_{LC}$ and $C_{RC}$ are the corresponding convolved pixel values. LUT $C_L$ and LUT $C_R$ are the corresponding values from the cyan toner density look-up table. Corresponding M terms are for magenta. Equivalent logic applies to all other relevant combinations of planes, namely cyan and black, magenta and black, and for horizontal edges and the same combinations of planes.

Figure 8:
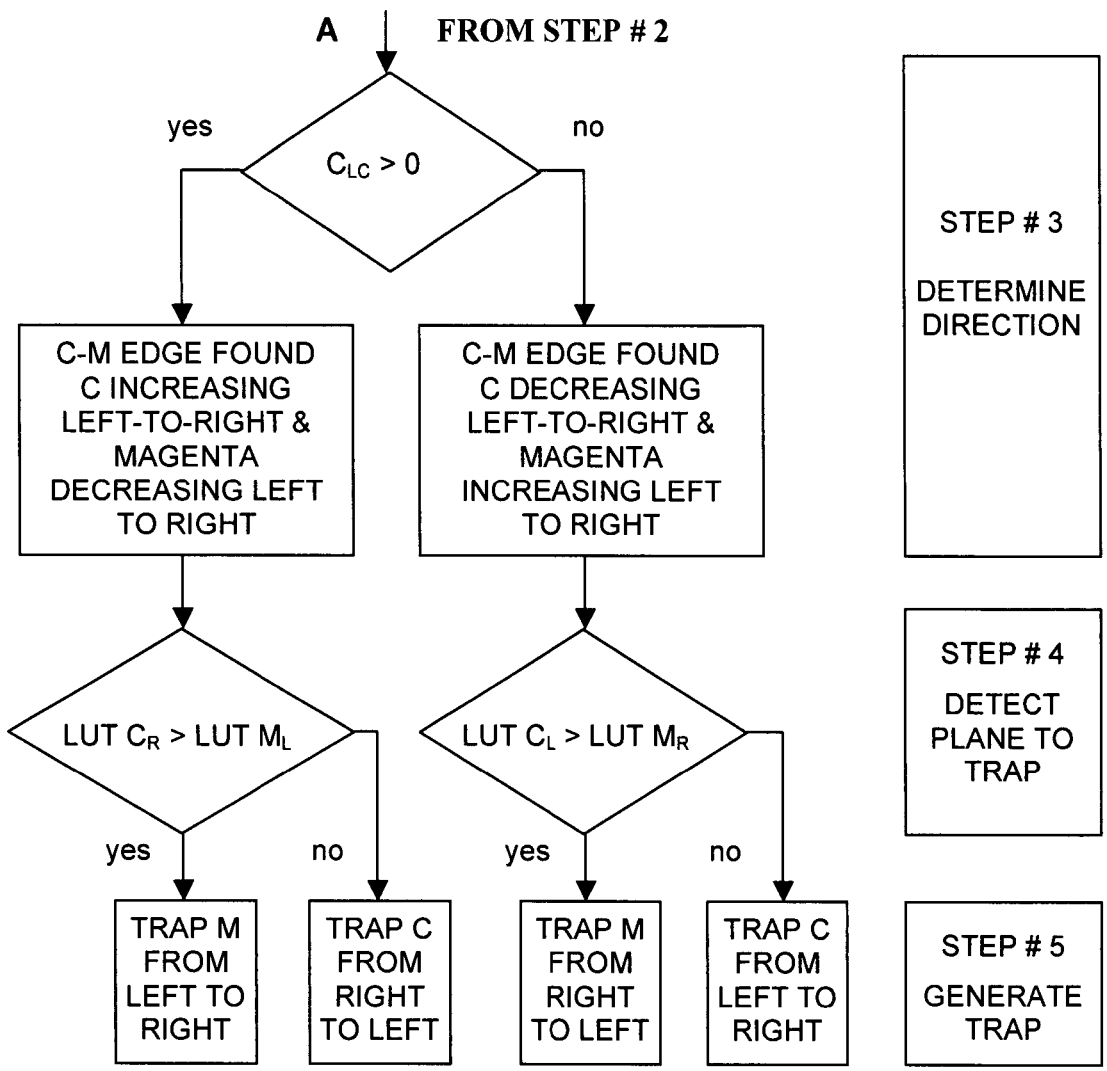
FIG. 8 is a flow diagram for steps 3, 4 and 5 of simple trap generation for cyan and magenta (C-M) planes.

FIG. 8 shows the flow diagram for steps 3, 4 and 5 of simple trap generation for cyan and magenta (C-M) planes. A trap is generated by increasing the value of the indicated color component of the pixel or pixels that are immediately adjacent and in the indicated direction. Equivalent logic applies to all other relevant combinations of color planes, namely cyan and black (C-K), magenta and black (M-K).

Figure 9:
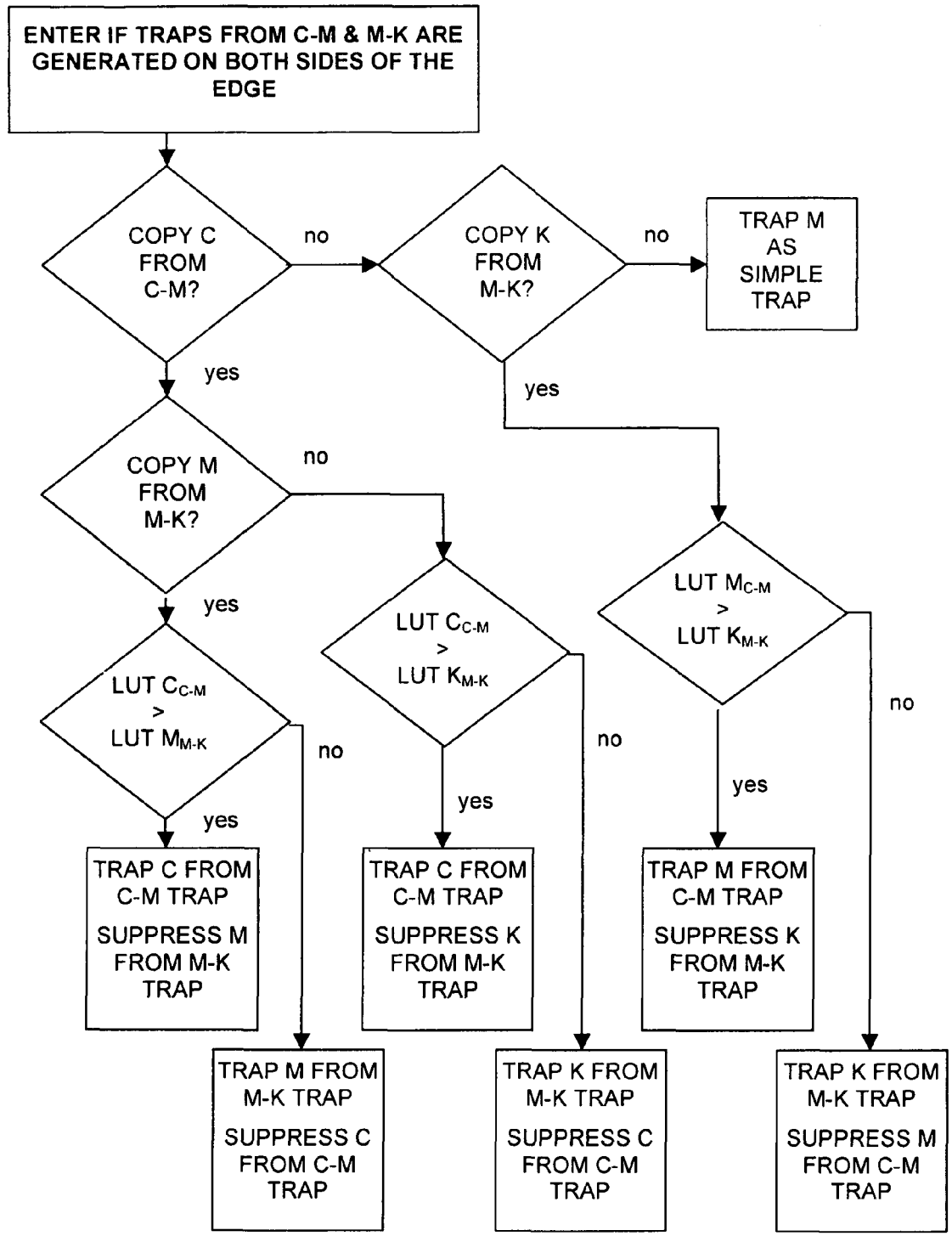
FIG. 9 is a flow diagram of single trap logic for a C-M and M-K trap combination.

FIG. 9 shows the flow diagram of single trap logic for a C-M and M-K trap combination. Equivalent logic is followed for C-M & C-K and M-K & C-K combinations. This logic is entered if simple trap logic executed for all color plane combinations at a pixel results in dual traps, dual traps being defined as traps on both sides of a color edge. Two coincident traps from two different colorants on the same side of an edge do not constitute a dual trap. Steps are, in order: determine which two colorants will generate traps; determine which of the two traps is the darker; generate the darker trap. The direction and width of a trap are carried over from the simple trap logic. FIG. 9 shows the flow diagram of single trap logic for a C-M and M-K trap combination. Equivalent logic is followed for C-M & C-K and M-K & C-K combinations. This logic is entered if simple trap logic executed for all color plane combinations at a pixel results in dual traps. Steps are, in order: determine which two colorants will generate traps; determine which of the two traps is the darker; generate the darker trap. The direction and width of a trap are carried over from the simple trap logic. More specifically, the decision block COPY C FROM C-M means if the simple trap rule generates a cyan trap at a cyan-magenta edge, copy the cyan pixel value. If true, the next decision block COPY M FROM M-K means if the simple trap rule generates a magenta trap at a magenta-black edge, copy the magenta pixel. If true, the next decision block LUT $C_{C-M}$>$M_{M-K}$ means if the look-up table value for $C_{C-M}$ is greater than the look-up table value for $M_{M-K}$, spread the copied C pixel from the C-M trap and suppress the copied M pixel from the M-K trap, otherwise, spread the copied M pixel from the M-K trap and suppress the copied C pixel from the C-M trap. The look-up table value for $C_{C-M}$ is the relative toner density value, i.e. the pixel value adjusted to take account of the print engine transfer function, for the cyan pixel trap candidate from the cyan and magenta (C-M) planes. Similarly the look-up table value for $M_{M-K}$ is the relative toner density value for the magenta pixel trap candidate from the magenta and black (M-K) planes. The remaining decision blocks in FIG. 9 operate in a similar fashion. Note that partial pixel trap widths use a calculated pixel value rather than a simple copy, but the single trap logic remains the same.

Trapping Parameters:

The present invention takes the Toner density curves or engine transfer function into account when calculating and generating traps. It requires this data in the form of look-up tables (referred to as Relative Toner density LUT, Toner Density LUT or simply LUT) for each Toner (called the Referent Toners) with 256 entries each, with the value in each entry corresponding to the relative density of that Toner with respect to the Black Toner (which will be called the Reference Toner) at the same index in the table. The LUT for the Black Toner should contain values increasing monotonically from 0 to 255.

In case a colorant has higher neutral density than the Black Toner, as may be the case for some marking engines, then that Toner will be the Reference Toner and the LUTs for the Referent Toners should be generated relative to the Reference Toner and its LUT must contain entries from 0 to 255 as described for Black Toner above (Black Toner will be considered a Referent Toner in this case). Since the Toner transfer curves are non-linear, it may happen that the density of a Toner at a certain level may exceed that of the Black Toner (or whichever Toner is the Reference Toner) at that same level, in this case the relative Density in the Referent LUT must be clamped at 255.

The following pseudo-code may be used to generate the relative LUT for each Referent Toner, given the engine transfer curves for each toner and assuming the engine transfer curve has 256 entries. If that is not the case, then the engine transfer curves will have to be interpolated to obtain exactly 256 entries in the engine transfer curve.

Loop for index from 0 to 255 using index i

Entry in Referent Toner *LUT* at index *i*=(Density of Referent Toner at index *i*/Density of Reference Toner at index *i*)*255.

Repeat loop. It will be understood that integer overflow and underflow issues must be handled correctly.

Simple Case of a Vertical Color Edge

The following steps will be taken to generate traps:
Find edges in all three planes independently of each other as shown in the description of "Edge detection" given above. Call the convolved pixel values in the three planes across the color edge $C_{LC}$, $M_{LC}$ & $K_{LC}$ on the left hand side of the edge and $C_{RC}$, $M_{RC}$ & $K_{RC}$ on the right hand side of the edge respectively.

Considering the Cyan and Magenta planes first, the flow-chart in FIGS. 7 and 8 illustrates how to generate Cyan-Magenta traps. After this the Cyan-Black and Magenta-Black pairs are considered individually and the same logic applied to these pairs. This is the logic for the Simple trapper which may generate 0, 1 or 2 traps on any given edge depending upon the various parameters. Although two traps on both sides of the same color edge may not seriously degrade the quality of the trapped image, it may be advantageous to ensure that any given edge will generate traps on at most one side. This is accomplished by the single trap mechanism which uses extra logic after step #5 in FIG. 8, Simple Trap Generation, if more than one pair of colors will generate traps on both sides on edge, i.e. either CM & MK or CK & MK or CM & MK. In these cases the single trapper picks the trap with the higher intensity and suppresses the trap with the lower intensity. The logic is shown in FIG. 9.

Another trap generation rule is the Super Black trapper. In this case, if the K level is above a given threshold, say 75% to 100% depending upon how dark the K toner is and the Super Black contains some amount of Cyan or Magenta, then none of the aforementioned rules are evaluated and Cyan and Magenta values outside the object containing the K toner are choked into the object, thus avoiding Cyan or Magenta fringes around Super Black objects, especially if they are on a white or light colored backgrounds as may be the case for black text. In the present invention the super black trapping rule states that if the value of the K colorant is above the super black threshold (which is a function of the particular electrographic process) and there is a significant difference between the cyan or magenta component (or both) in the black object and the same component or components in the background, then all other trapping rules are ignored and the cyan and magenta colorants in the background always choke into the super black object, or vice-versa in the case of a light colored object on super black background. Since by definition the super black threshold is high, this rule applies to very dark objects only and the choking will not result in a visible halo. The rule can also be generalized for the magenta and cyan colorants such that if the density values of the different colorants that comprise a colored object on a white (or very light) background are all very high, then the lighter colorant may be choked into the object to prevent color halos from appearing in the case of misalignment. Note that this rule runs counter to the usual one of generating a trap only if two colorants change values across the edge in opposite directions. This rule is invoked especially when the colorants change value in the same direction across the colored edge, i.e. the object contains large amounts of cyan, magenta and black whereas the background contains very little or none of the colorants, or vice-versa in the case of a white object on a very dark background.

Although the flowcharts in FIGS. 7, 8, and 9 illustrate trap generation for vertical edges by comparing pixels to the left and right of an edge, it will be understood that the same technique is applied for horizontal edges, i.e. the pixel values above and below the edge are used for computing the traps.

Edge Detection Across Color Planes

Figure 10:
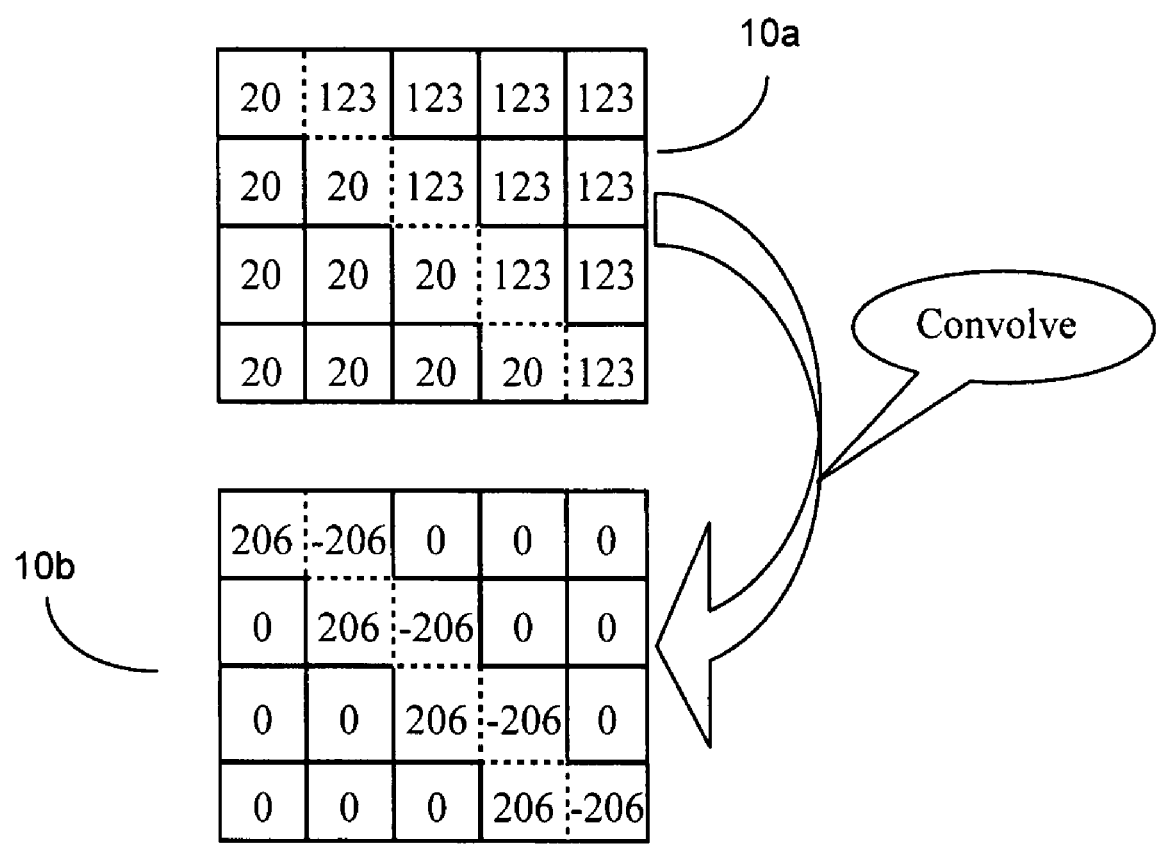
FIG. 10 applies the convolution example given in FIGS. 4, 5 and 6 to the cyan plane of a color image.
Figure 11:
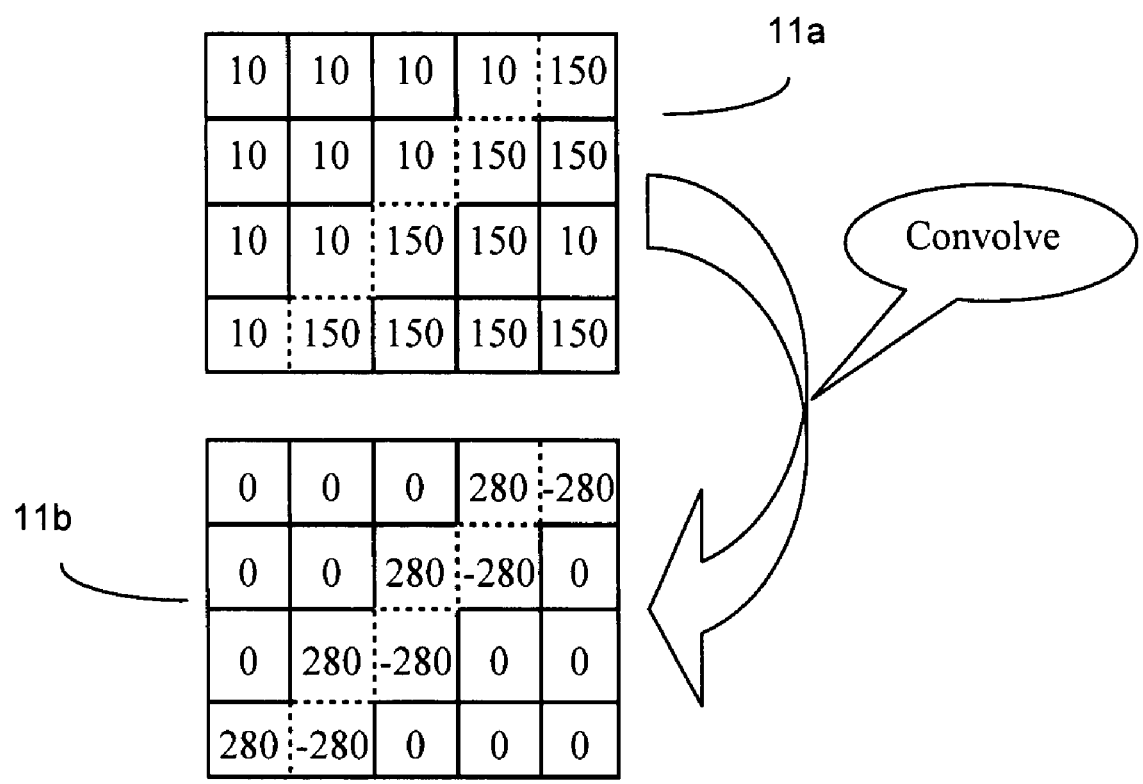
FIG. 11 illustrates convolution of an example portion of a magenta plane in an image with a Laplacian kernel.
Figure 12:
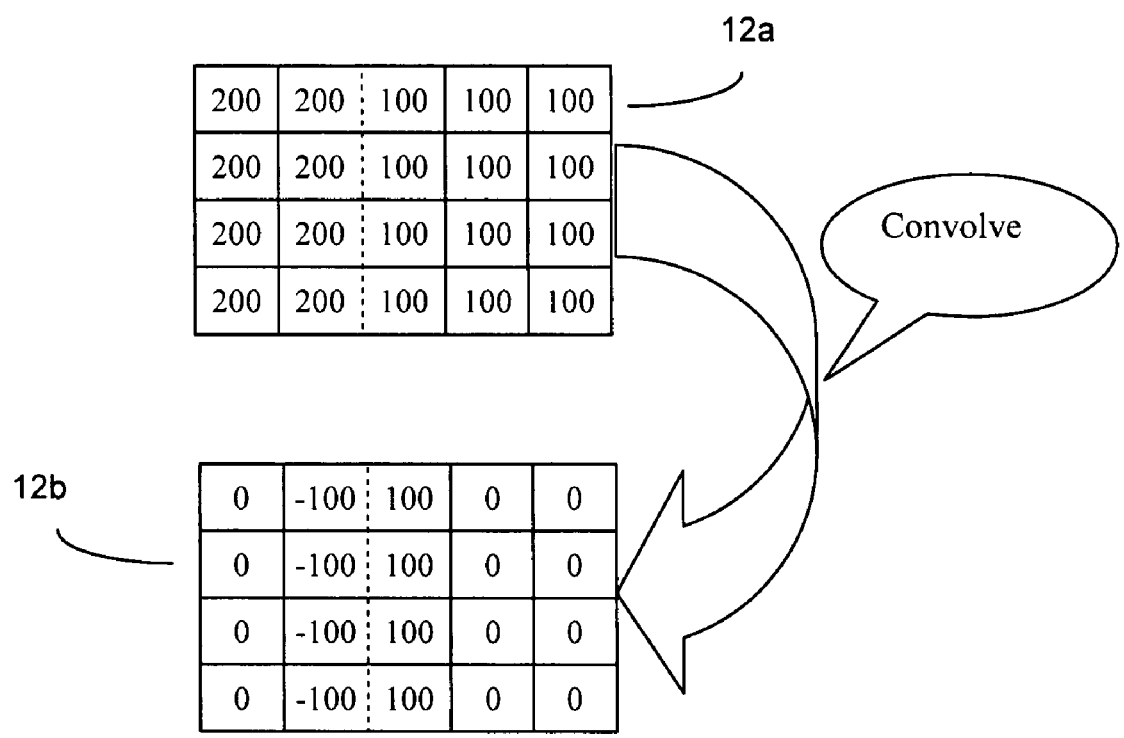
FIG. 12 illustrates convolution of an example portion of a black plane in an image with a Laplacian kernel.

FIG. 10 "Cyan convolve", FIG. 11 "Magenta convolve", and FIG. 12 "Black convolve", illustrate how each of the Cyan Magenta and Black planes are convolved independently of each other. A dashed line represents the color edge in each color plane.

After the convolve operation, pairs of these convolved planes are examined to find color edges that need to be trapped. Using the algorithm shown in FIG. 7, the convolved Cyan and Magenta planes are used to determine coincident color edges in both planes as shown in Step 1.

Figure 13:
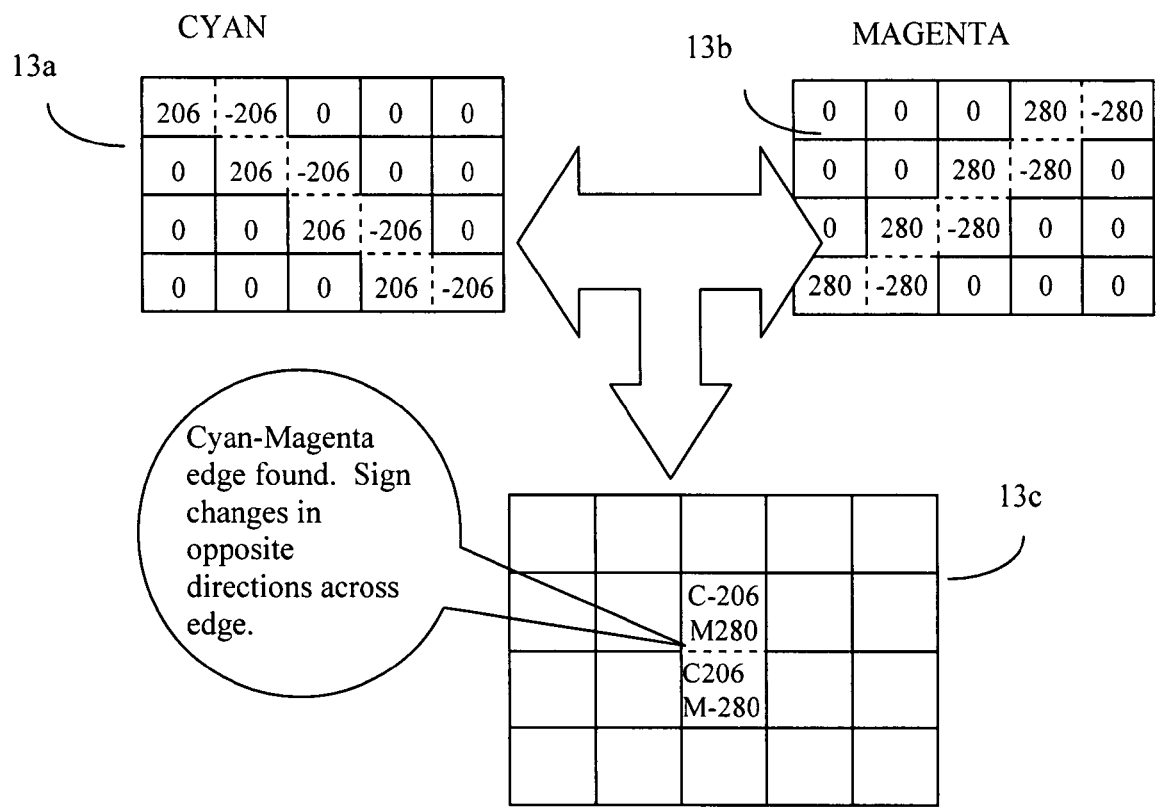
FIG. 13 illustrates how a convolved cyan plane and magenta plane are compared to detect an edge.

FIG. 13, "Edge detection for Cyan-Magenta planes", illustrates how a pixel-by-pixel comparison is performed for the Cyan and Magenta convolved planes and color changes on the same edge in opposite directions in each plane are found. In this contrived example only one edge (a horizontal one) has been found that passes the edge detection criteria given in Step 1 in FIG. 7. Generally, an edge in Step 1 is detected if the sign of the convolved value in both the convolved Cyan and Magenta planes changes in opposite directions across any pair of pixels, which in this case happens to be between the pixels at (2,1) and (2,2) assuming an origin (0,0) at the top left of the array.

Figure 14:
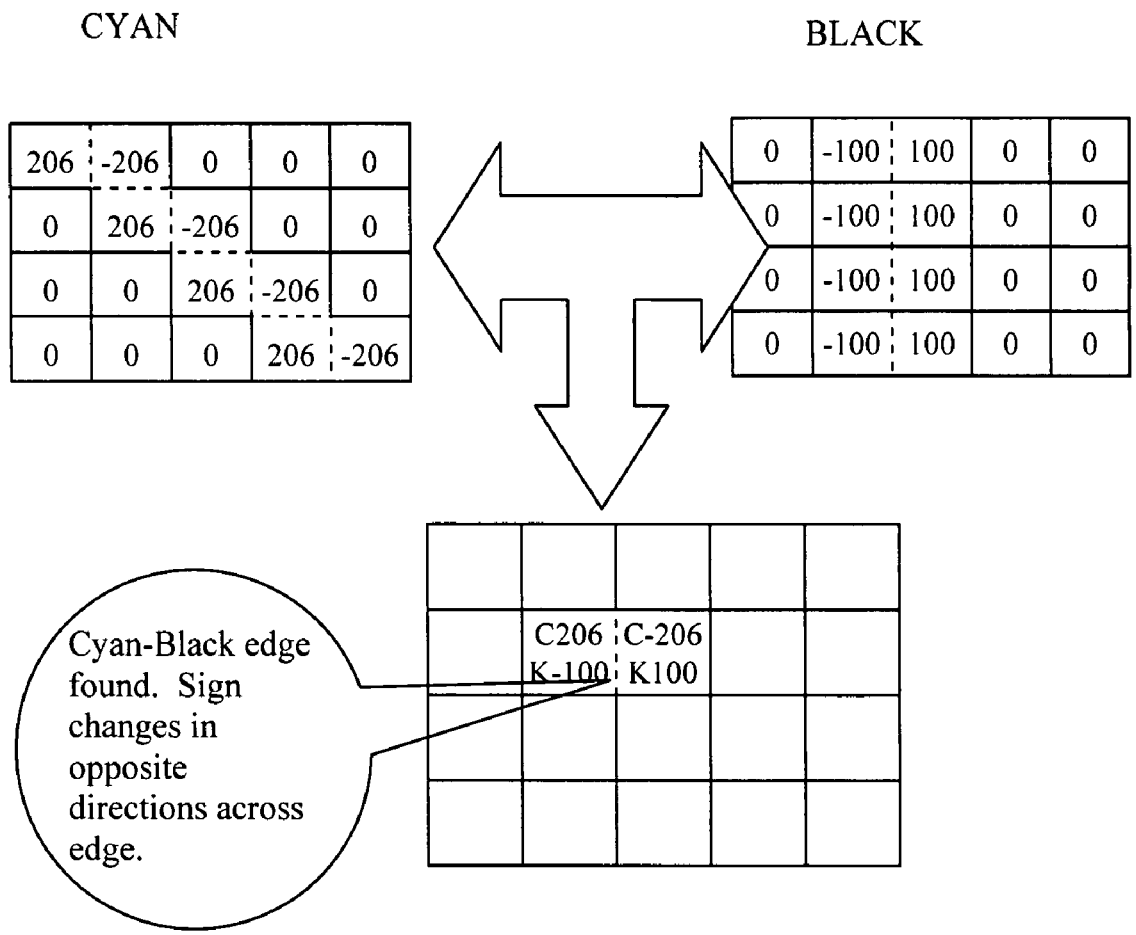
FIG. 14 illustrates how a convolved cyan plane and black plane are compared to detect an edge.
Figure 15:
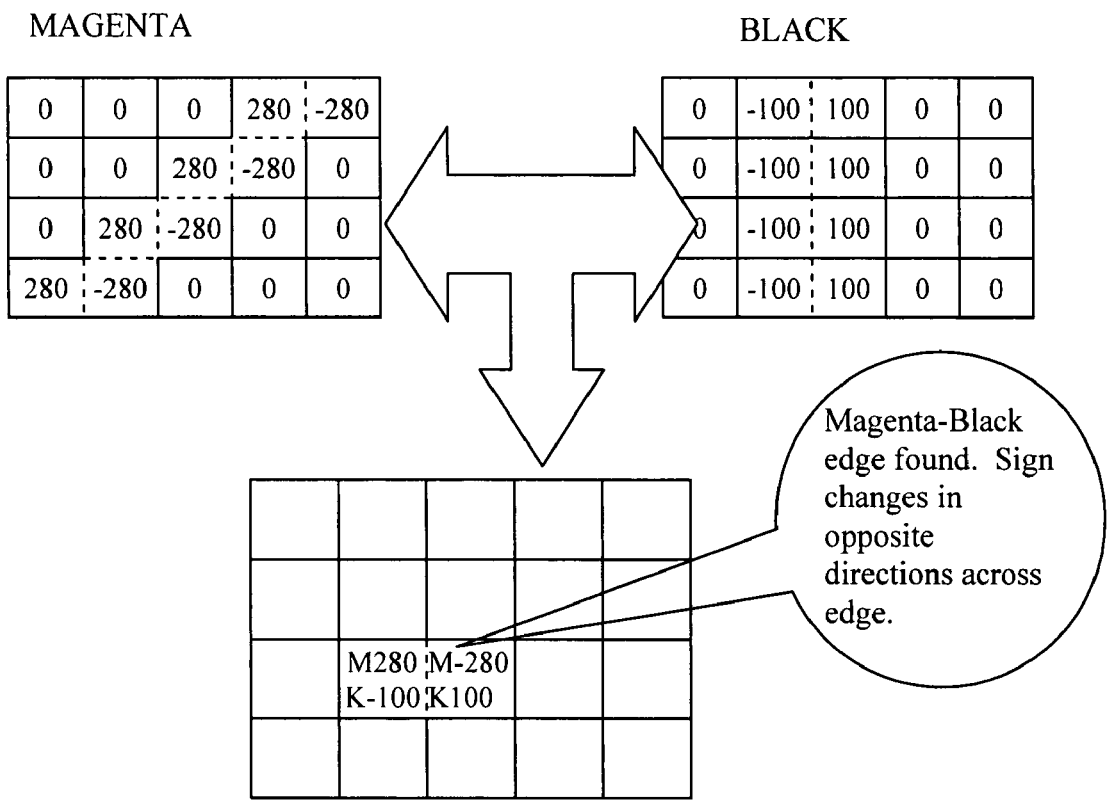
FIG. 15 illustrates how a convolved magenta plane and black plane are compared to detect an edge.

FIG. 14, "Edge detection for Cyan-Black planes", and FIG. 15, "Edge detection for Magenta-Black planes", illustrate the same procedure followed to detect edges between Cyan and Black planes and Magenta and Black planes respectively.

Generation of Traps of Various Widths

Figure 15A:
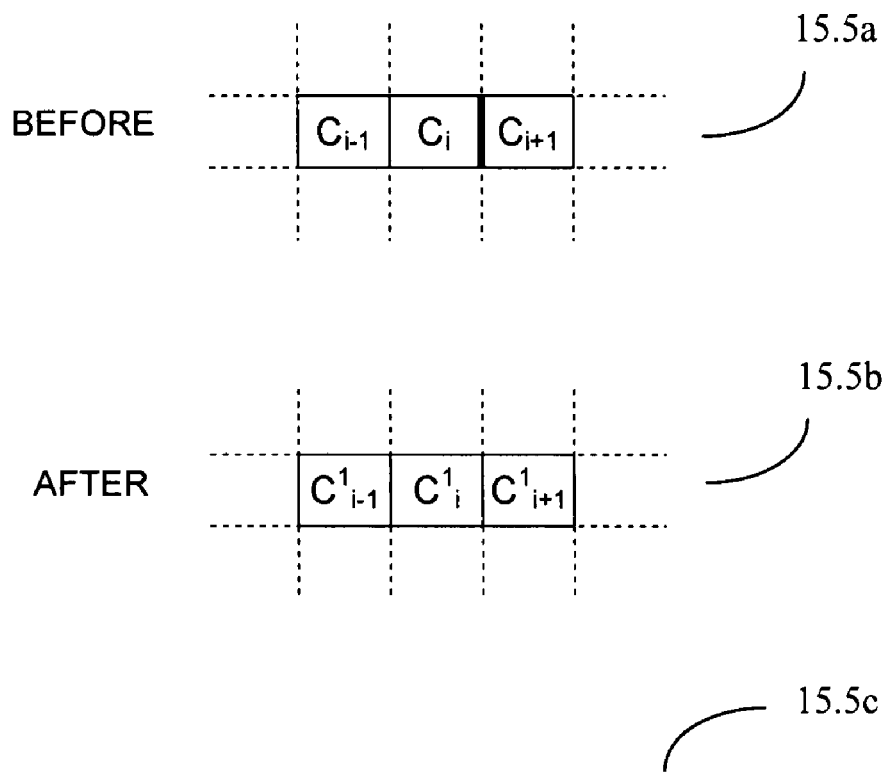
FIG. 15A shows trap generation for the case of a trap in the cyan plane from right to left.

FIG. 15A shows how traps of various widths may be generated, the required width being a parameter of the system and chosen as sufficient to reduce the visibility of registration errors. Traps which are an integral number of pixels in width are generated pixel-by-pixel by copying the appropriate pixel value to the adjacent pixel or pixels across an edge. Partial pixel width is simulated by a combination of selecting the width of the trap and adjusting the appropriate color values of the pixel or pixels adjacent to the edge. The effect of halftoning along with the modulation of the pixel value results in a perception of a trap that has partial pixel width. In FIG. 15A the table 15.5c shows how pixel values are changed to generate traps 0.5, 1.0, 1.5 and 2.0 pixels in widths. It will be understood that wider traps may be generated by extending the same rules.

With reference to FIG. 15A, a trap 0.5 pixels wide for trapping in the cyan plan across an edge from right to left is simulated by adjusting the value of $C^1_i$ according to the formula:

$$f(C_i, C_{i+1}) = \left[\frac{C_i + C_{i+1}}{2}\right]$$

Where:
$C_i$=Value of Cyan pixel on the left side of the color edge
$C_{i+1}$=Value of Cyan pixel on the right side of the color edge
[ ]=the round up to nearest integer operator A 1½ pixel wide trap is simulated by adjusting values of $C^1_i$ and $C^1_{i-1}$ as shown at table 15.5c in FIG. 15A.

It will be understood that the same rules apply in the cases of trap generation for other directions and edge orientations and in other color planes.

Practical Consolidation of Simple Trap Generation and Single Trap Generation

The somewhat complex set of decisions and operations laid out in FIGS. 7, 8 and 9 can be simplified in practice when it is recognized that the number of possible cases for trapping a composite pixel is small enough for implementation by table lookup, whether in software or hardware. The simplification consolidates for all relevant combinations of color planes the trap direction decision 7a in FIG. 7, steps #3, #4 and #5 in FIG. 8 and the single trap logic in FIG. 9. For each composite pixel, which has three color values in the respective cyan, magenta and black color planes and beginning with the trap direction decision 7a in FIG. 7:

Identify which of the two pixels on each side of an edge has the larger value in each color plane. There are eight possibilities.

Of the three larger values identify the color of the middle value. There are three possibilities, cyan, magenta or black.

It will be understood that there are then 8×3=24 possible outcomes of these two identification steps, outcomes established by the rules illustrated in FIGS. 7, 8 and 9 and that indicate specifically which pixels should be trapped and, if so, the colors and sources for the color values to be assigned.

Note that the method illustrated in FIG. 15A and its extensions still apply for the calculation of traps of different widths. Also, yellow spreading and super black methods remain applicable.

Hardware

A trapper hardware implementation must satisfy the following general objectives:

Functional: Implement the trapping algorithm described above.

Design: Be compatible with high-performance imaging pipelines used in raster image processors. In the example described here, the hardware is envisaged as a combination of application-specific logic, referred to here as "chip" or "logic," with a programmable general-purpose CPU and its associated system memory. Minimize use of memory and avoid using temporary buffers in system memory, instead working only from input buffers and writing once to output buffers. Minimize use of memory bandwidth by using burst accesses and minimum re-fetching of data.

Size: In the example described the trapper logic is economical in its use of gates, including flop-based register files and FIFOs, and on-chip memory.

This section highlights those portions of the algorithm that affect hardware implementation.

1. Detect Object Edges. The first step is to locate the colored edges of objects. The algorithm uses a convolution function and multiple levels of thresholding to detect edges on each plane—cyan (C), magenta (M), and black (K)—which are detected independently of one another. The yellow plane is not used in this step. Convolution is a function of a pixel and its neighbors. The present method uses a 3×3 convolution matrix. As will be seen later, the use of neighboring pixels places special requirements on the hardware implementation.
2. Detect Coincident and Opposing Edge Transitions between Planes. Once edges are found on each plane, the present method compares edges between all three planes C, M and K. If there is at least one pair of planes with coincident edges and if the edges transition from light to dark and dark to light in opposite directions (where light and dark correspond to low and high pixel values respectively), then the edge coincidence requires trapping. The hardware implementation for this step requires a number of comparators.
3. Determine Which Plane to Trap. Once it is determined to trap an edge coincidence, the algorithm next identifies on which plane the trap should be performed, and in what direction the trap should occur. This step is straightforward to implement in hardware.
4. Generate Trap on That Plane. Generation of a trap means copying a pixel value (or percentage of a pixel value) from one side of an edge to another. The method supports ½-pixel to 2-pixel traps (in ½ pixel increments), so the hardware must support moving of a value by up to two pixels from its origin.

It will be understood that the Trapping algorithm is a configurable algorithm that can be operated in different modes with different options. For this example of implementation in hardware, Tables 1, 2 & 3 show which modes, options and configurations are supported.

TABLE 1

Trapping Modes

| Mode | Definition |
| --- | --- |
| Simple Mode | A mode of the algorithm that allows pixels to be spread or choked on more than one plane for the same edge. |
| Single Mode | A mode of the algorithm that operates the same as Simple Mode, except it limits pixel modification to only one plane for the same edge. |

TABLE 2

Trapping Options

| Mode | Definition |
| --- | --- |
| Yellow Spreading Option | A mode of the algorithm that spreads or chokes the yellow plane whenever the same is done to the cyan or magenta planes. |
| Super Black Trap Option | A mode of the algorithm that chokes cyan and magenta underneath the edge of process-black. |
| Relative Trapping Threshold Option | A mode of the algorithm that uses a relative instead of absolute trap threshold. Since Relative Trapping Mode only takes effects at the low color density levels, it does not provide perceptible quality improvement. |

TABLE 3

Trapping Configurations

| Mode | Definition |
| --- | --- |
| Convolution Matrix Size | The size of the convolution matrix used by the algorithm to detect edges in an image, as well as their "direction:" light to dark versus dark to light. |
| Convolution Matrix Type | The type of convolution calculation performed on the convolution matrix. |
| Trap Width | The number of pixels to spread or choke past an edge that requires trapping. |

Hardware Glossary

Table 4 defines terms that are used in this description. It will be understood that where specific numeric values are given it is to maintain consistency within the example given in this description and that other consistent numeric values can be chosen by those skilled in the art.

TABLE 4

Common Imaging Pipeline Terms

| Term | Definition |
| --- | --- |
| Band | A collection of raster data that is the width of a plate, and up to 256 scanlines high. A band can be divided into stripes on an N-up page. A stripe is the height of a band, but, for example, one-half the width of a band for a 2-up plate and one-quarter the width of a band for a 4-up plate. A band or a stripe, in turn, is divided into subbands, which are also up to 256 scanlines high, but up to only 256 pixels wide. A subband, in turn, is divided into cells, which are up to 32 pixels wide and up to 32 scanlines high. |
| Cell | A block of pixels up to 32 pixels wide and up to 32 scanline high. For 8 bpp, one component cell equals up to 1,024 bytes, and one 4-plane composite cell equals up to 4,096 bytes. |
| Composite Entity | A composite entity is the collection of all entities from each component color plane. For example, a CMYK composite pixel is the collection of four pixels, one each from the four color planes. Likewise, a composite band is the collection of all the bands for all color planes. This is in contrast to a component pixel and component band. A composite entity is made up of its component entities. A composite entity can, but does not normally include non-color entities, such as attribute bytes. |
| Component Entity | A component entity is an entity from a single color plane. For example, a component pixel is single pixel for one color plane. Likewise, a component band is one band for one color plane. It takes one or more component pixels to make a composite pixel, and likewise for a composite band. |

TABLE 4-continued

Common Imaging Pipeline Terms

| Term | Definition |
| --- | --- |
| Pane | The term pane refers to one portion of a plate that has been divided into equal parts for an N-up page. A pane includes the original page image, usually scaled down, as well as white padding to fill out the pane. By definition, there is no gap between panes of a plate. Panes of a plate are adjacent to one another without any intervening pixels. |
| Plate | The term plate refers to a single raster image that covers one side of a piece of paper. In the context of an N-up page, a plate is composed of panes. |
| Sheet | The term sheet refers to a piece of paper. A sheet has two sides, or plates. |
| String | The term string is used specifically in conjunction with the Trapper IP module, and specifies a scanline of 36 or 38 pixels, made up of 32 pixels from a scanline of a cell, plus two or three neighboring pixels on the left of the scanline, plus two or three neighboring pixels to the right. |
| Stripe | A collection of raster data that is the width of a pane, and up to 256 scanlines high. While a band is the result of dividing up a plate, a stripe is the result of dividing up a pane. In the same way that panes form a plate, two or more stripes form a band. Also similar to a band, a stripe is divided into subbands, which are also up to 256 scanlines high, but up to only 256 pixels wide. A subband, in turn, is divided into cells, which are up to 32 pixels wide and up to 32 scanlines high. |
| Subband | A block of pixels up to 256 pixels wide and 256 scanlines high. Bands or stripes are divided into subbands, and subbands are composed of cells. For 8 bpp, one component subband can equal 64 Kbytes, and one 4-plane composite subband can equal 256 Kbytes. Note that one subband contains up to 64 cells. |

Figure 16:
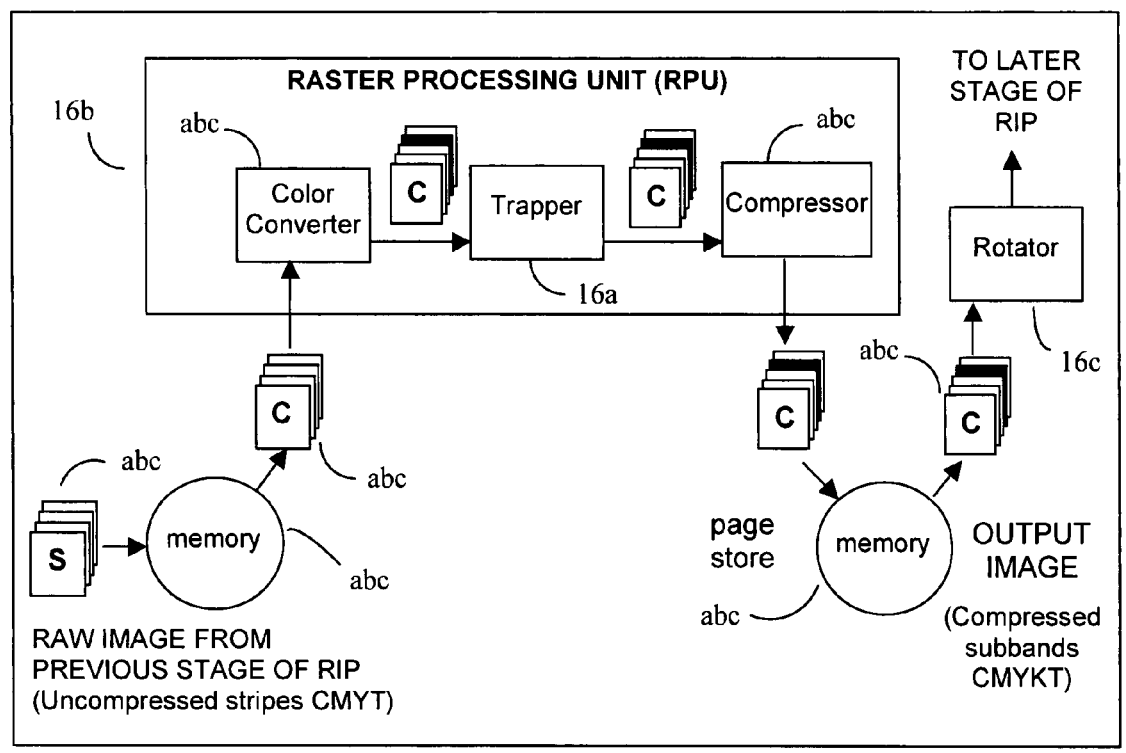
FIG. 16 shows an imaging pipeline context for a trapper module and the image data formats at the various stages.

The trapper hardware is a component in a pipeline of image processing stages in a raster processing unit (RPU) which is itself part of a raster image processor. As in customary practice in the field, images are in the form of arrays of pixel data C, M, Y and K representing cyan, magenta, yellow and black color separations respectively, plus a fifth array, labelled T for tag, to carry attribute information required for certain image processing steps. Examples of the attribute information include pixel-by-pixel selection of color conversion table and halftone table. As shown in the example of FIG. 16, the trapper module is preceded by color conversion and followed by a compressor, also known as a Subband Compressor. In a simple case, a raw image is read in CMYT raster format. Note that this represents a particular intermediate format and that other formats may be used. After color conversion the format is conventional CMYK plus tag plane T in this example FIG. 16 also shows a rotator module which is important to the implementation of the trapper because the design objective for the rotator of being economical in its use of memory enforces data format choices that affect earlier stages including the RPU and trapper, as discussed in the next section.

FIG. 16 shows an imaging pipeline context for a trapper module 16a and the image data formats at the various stages. A trapper module can be placed in the pipeline of a raster processing unit (RPU) 16b, which in turn is in the pipeline of a raster image processor (RIP) 1d in FIG. 1. In the example above, a rotator 16c appears after the RPU as a part of the RIP pipeline. In the image data format symbols the abbreviations CMYT or CMYKT identify cyan, magenta, yellow and tag planes or cyan, magenta, yellow, black and tag planes respectively where the tag plane carries certain image attribute data.

Rotator Data Format Requirement

A customary design requirement for an image processing pipeline is that it use little memory, which is generally addressed by dividing plates and panes into bands, stripes, and subbands. Near the end of the pipeline, raster images must be able to be rotated, band by band. To accomplish this economically, stripes must be divided into subbands, which the rotator is designed to rotate, which in turn allows it to step vertically through a logical plate and, as each subband is rotated, to construct a new horizontal band of subbands. This horizontal band can then be consumed by a Print Engine Video Controller (PVC) for output to the video interface of the print engine.

Although the rotator operates on subbands, good logic design requires it to break rotation of subbands into cells 32 pixels wide by 32 scanlines high, for which it uses a 1 Kbyte block of memory per plane. To support this operation, the RPU and trapper provide subbands divided into cells that can be individually rotated by the Rotator. It should be noted that subbands are compressed as they exit the RPU, and they are decompressed after they enter the rotator module. However, this is not significant to this data format discussion nor to the requirements that data format places on these stages of the pipeline.

Hardware Implementation versus Software Implementation

Figure 17A:
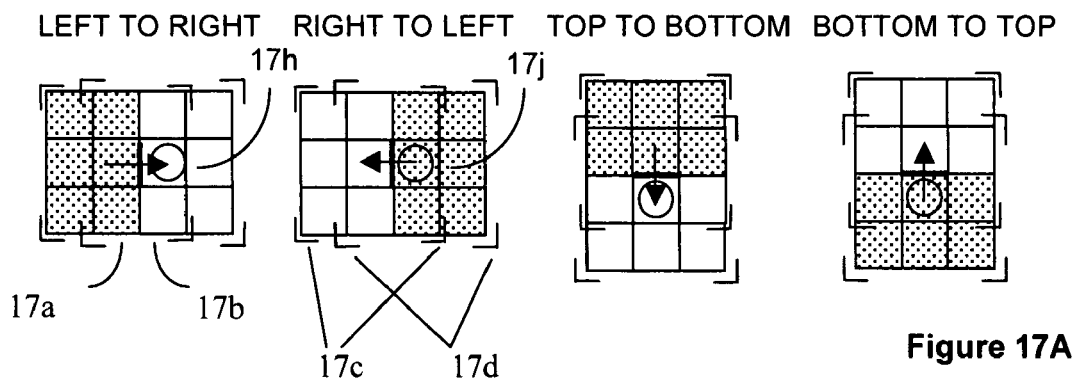
FIG. 17a shows the convolution matrices for a software implementation of a trapping algorithm.
Figure 17B:
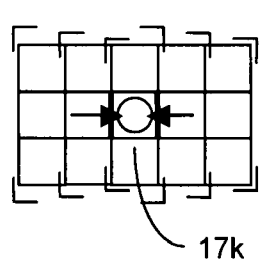
FIG. 17b shows the convolution matrices for a hardware implementation of a trapping algorithm.

It will be understood that implementations may differ in ways that do not conflict with the principles of the present invention. For example, hardware and software implementations are likely to show characteristic differences in how each processes pixels. Whereas software implementation may well use temporary buffers to hold convolution results for each plane it is a practical goal of hardware to not require temporary buffers in system memory, in order to minimize memory bandwidth and memory consumption. Another significant difference concerns data access. Input data to Trapper is randomly accessible. That is, any portion of a band can be read and re-read, or revisited, during processing, and in fact Trapper takes advantage of this to re-fetch pixels that neighbor the cell it is currently processing. Output pixels, however, cannot efficiently be re-written or revisited. As each cell of each subband is processed, it is compressed and written to memory. Once compressed, those output pixels may not be accessed again. However, with reference to FIG. 17A, the software implementation can move pixel values across detected edges to the opposite side, from left to right, right to left, top to bottom, and bottom to top. FIGS. 17A and 17B show the convolution matrices for software and hardware implementations of a trapping algorithm illustrating the differences between them.

The case for software is shown in FIG. 17A which shows for the lighter color plane involved a number of examples of edges that may require trapping and configurations of convolution matrices that are processed according to trapping algorithms. Regions shaded as in 17*a* and 17*b* are the darker and lighter regions respectively of the lighter color. Convolution matrices are identified with corner marks as in 17*c* and 17*d*. Pixels 17*h* and 17*j* are current pixels being processed. In this case, input and output pixels are randomly modifiable and there is no difficulty in copying a color value from left to right into a current pixel 17*h* or in copying the color value of a current pixel 17*j* from right to left as shown. There is equivalent flexibility in the vertical dimension, i.e. top to bottom and bottom to top.

The case for hardware is shown in FIG. 17B which shows configurations of convolution matrices identified with corner marks as in 17*e*, 17*f* and 17*g*. In this case trapping modifications to an output pixel 17*k* must be complete before it is passed to the next stage of an imaging pipeline requiring in turn that all applicable convolutions must be calculated. The figure shows an example of such a set of convolutions for a one-pixel trap.

Given the ordering of processing of cells through a subband, this presents a difficulty at the edges of a cell for hardware implementation. If a horizontal edge coincides with the top of the band boundary, and if the trapping algorithm determines that a pixel value should be moved from the bottom side of the edge to the top, this would require moving the pixel across the band boundary into the last scanline of the previous band. However, that band no longer exists in an uncompressed form; instead, it is stored, compressed, in a page store in system memory.

Figure 17B:
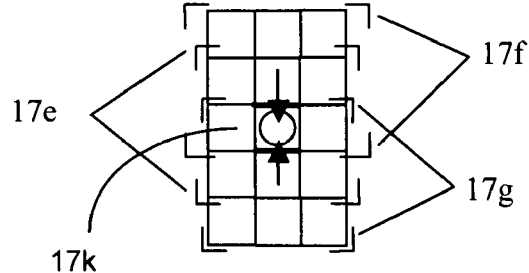

Conceptually, for the hardware implementation, the following rule applies: the Trapper must process data by making all necessary updates to an output pixel and, in general, it may not make a second update to a pixel, especially to a pixel in the scanline above. This allows the Trapper to turn the pixel over to the next stage of the pipeline without needing to access it again. This is important for the imaging pipeline, since the next stage is the Subband Compressor, and once a pixel is compressed, it may be difficult to access it again. Thus, the bottom half of FIG. 17 shows how the Trapper concentrates processing on the current output pixel, and therefore it must consider all sources of updates to that pixel. It can be seen that up to five convolutions must be calculated to determine whether to modify, or trap, the output pixel.

Figure 18:
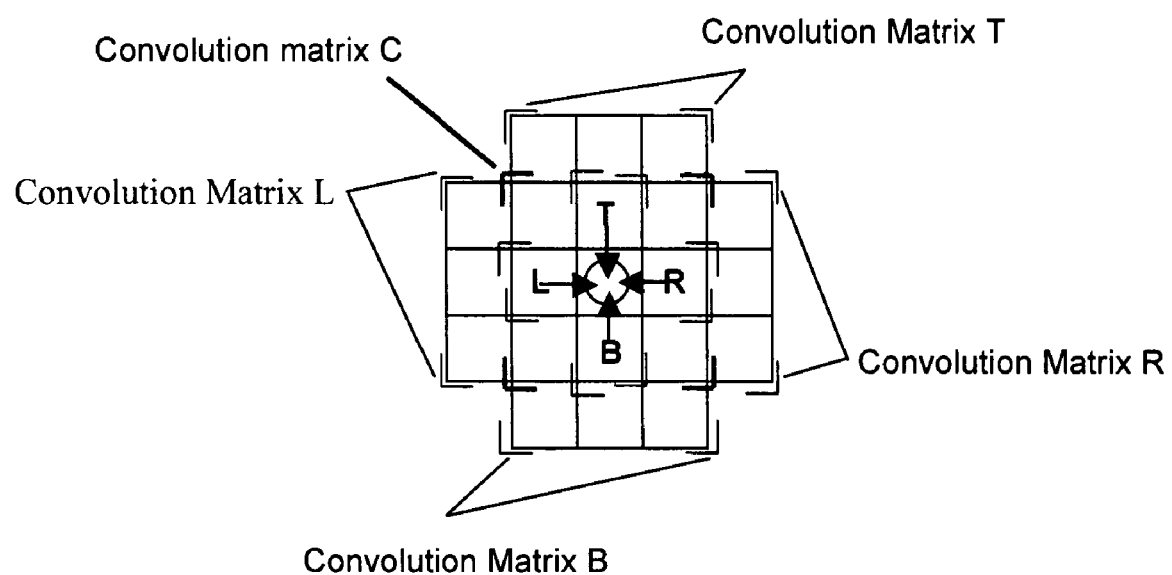
FIG. 18 shows the set of five convolution matrices used in a hardware implementation of a trapping algorithm for trap widths of 0.5 and 1.0 pixel

FIG. 18 shows combining left, right, top, bottom and center convolutions together in one step. Fortunately, the logic it takes to implement convolution and decision processing to determine whether or not to trap is not large, so paralleling these steps does not greatly impact ASIC design.

Two-Pixel Trap Nine-Way Convolution

Figure 19:
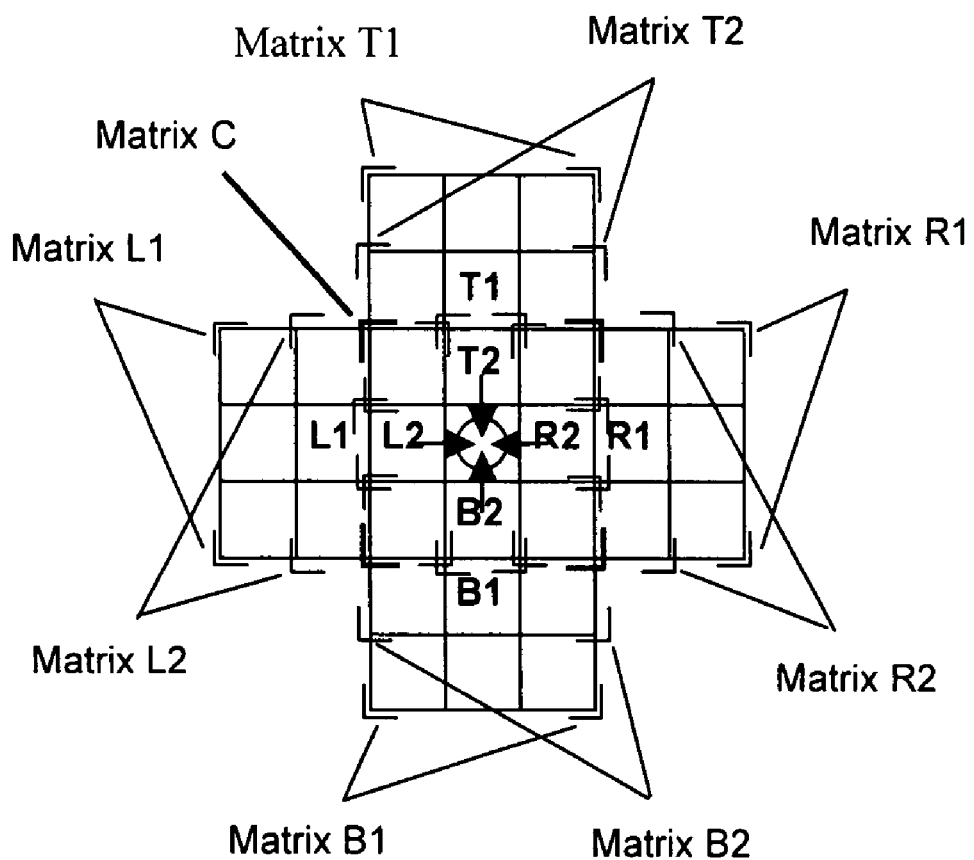
FIG. 19 shows the set of nine convolution matrices that are required for a hardware implementation of a trapping algorithm for trap widths of 1.5 and 2.0 pixels.

In the discussion of differences between software and hardware implementations, parallel processing of convolutions was introduced to deal with band boundary conditions. To perform this analysis, neighboring pixels within the central scanline are required, in addition to neighboring pixels in the previous and successive scanlines. In the case of 1.5- and 2.0-pixel traps, the Trapper requires seven scanlines of pixels to be available to it as can be seen in FIG. 19, buffered in a suitable well-known way. Performing five convolutions (L, R, T, B, C) is necessary when doing 0.5- or 1.0-pixel traps. For 1.5- or 2.0-pixel traps, more convolutions can affect the same pixel, so as shown in FIG. 19, nine parallel convolutions and decisions must be made.

A larger issue for parallelism, however, concerns one-dimensional Relative Toner Density (RTD) Lookup Tables (LUTs). It might seem that many LUTs would have to be duplicated to allow for parallel decision processing. However, only five duplicates of one-dimensional LUTs per plane are required, one for each string of pixels that passes horizontally through the five-scanline high convolution "+" pattern in FIG. 18. The five lookups have to be done ahead of the convolution "+" as it scans the five strings that Trapper holds in on-chip memory.

Extension for Greater Registration Errors

It will be understood that traps must be wider than two pixels if registration errors exceed two pixels, and that more convolutions and correspondingly more buffering will be required according to straightforward extension of the examples described here.

Imaging Pipeline Data Flow

As shown in FIG. 16, color conversion operates on four planes in a well-known format, CMYT, which is customarily a device independent representation. A Color Converter reads these four planes, and produces a conventional device specific representation in five planes, CMYKT. These data are passed directly from the Color Converter to the Trapper, which performs trapping and then passes the data on directly to a Subband Compressor. The Subband Compressor compresses the data and stores it into memory. The mode attributes tag plane (T) is put into memory along with CMYK, but it is not required by or affected by color conversion or trapping. Instead, the mode attributes tag plane must eventually rejoin the CMYK data, so that it may accompany it to a Print Video Controller where mode bits will be used to render a device-specific halftone image by generally-understood means. Besides color converting, overlaying, and trapping the data, the RPU transforms the data from uncompressed stripes to compressed subbands. Compression is required to maximize the use of the page store in system memory, and subbands are required by the Rotator so that it can efficiently rotate page images in a reduced system-memory environment. To rotate at engine speed, the Rotator takes advantage of on-chip memory, but this also limits the block of pixels that the Rotator can process in a step to one 32×32 cell. Thus, to support the Rotator's requirements, subbands must be divided into cells. Within a plane, data must be correctly ordered so that the next consumer of this data—the Rotator—can efficiently rotate it.

Trapper Module Data Format and Order

Figure 20:
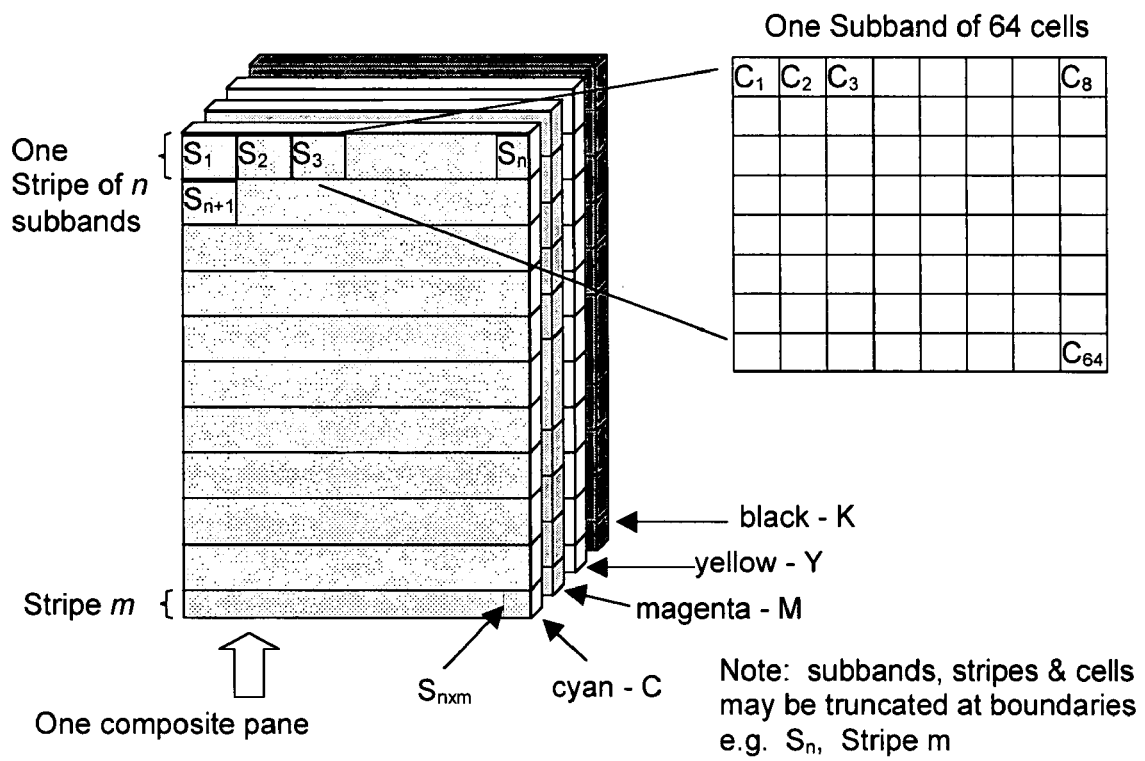
FIG. 20 shows how the image data are organized within an image processing pipeline.

FIG. 20 shows how the image data are organized within an image processing pipeline. A composite image pane consists of four planes of color separations, namely cyan, magenta, yellow and black. Each separation within the composite image pane is divided into stripes. Each stripe is subdivided into subbands. Each subband is subdivided into cells. The division and subdivisions are regular and the stripes, subbands and cells have equal respective sizes except that the stripe, subband or cell at a pane boundary may be truncated.

Figure 21:
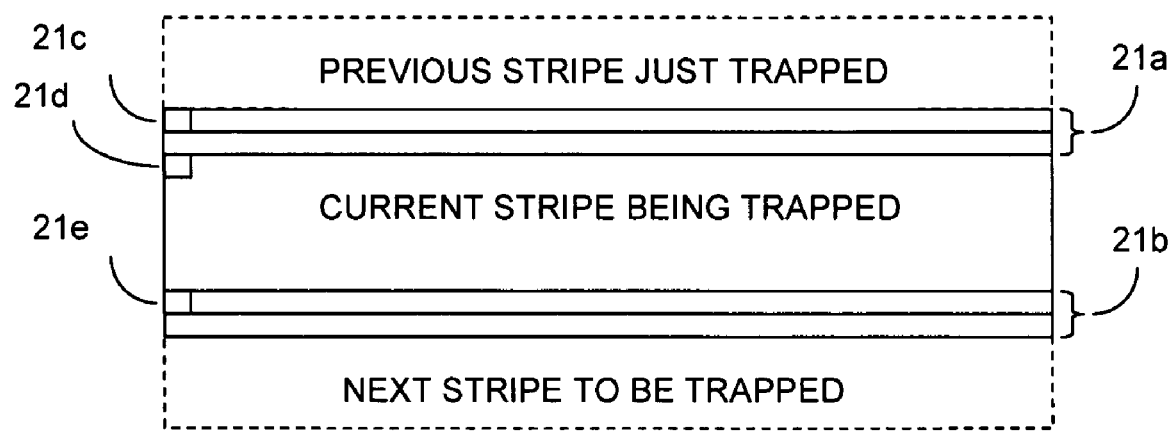
FIG. 21 illustrates the layout of image data in memory and shows a conceptual relationship between the current stripe being trapped, the previous stripe just trapped and the next stripe to be trapped.
Figure 22:
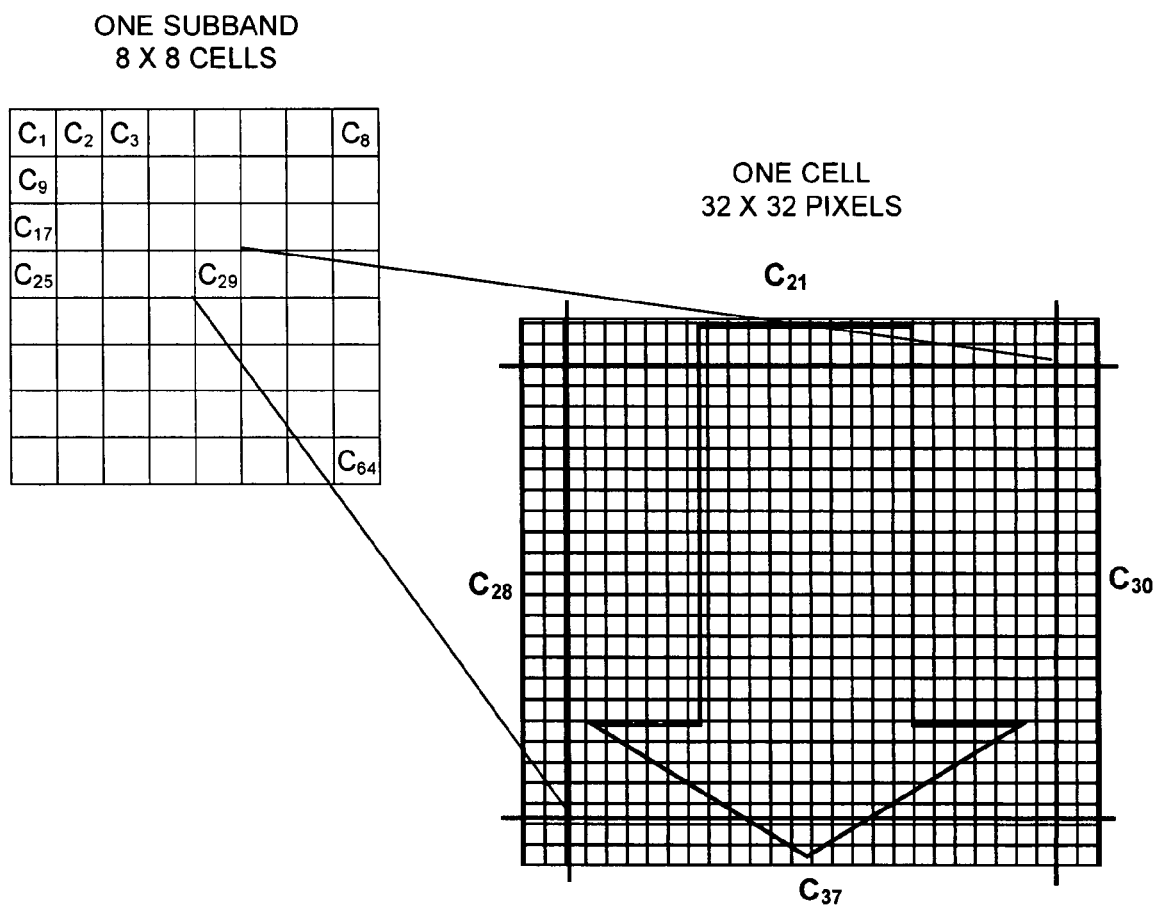
FIG. 22 shows the organization of cells and pixels within a subband and the order in which they are processed by a hardware trapper implementation.

FIG. 20 shows the four planes of device CMYK that are produced by the Color Converter and delivered to the trapper. Each plane is divided into stripes, each stripe is divided into subbands, subbands are divided into cells, and cells are made up of blocks of 32×32 pixels. To satisfy the Rotator's requirement, trapper processes one stripe of subbands at a time. It starts with the leftmost subband in a stripe, for example the subband labeled S1 in the first stripe (or $S_{n+1}$ in second stripe), and moves through a subband cell by cell. Within a subband, a trapper processes one cell at a time. Note that when a trapper processes a cell, it requires neighboring pixels, as shown in FIGS. 21 and 22. To process a cell, a Trapper requires 36- or 38-byte strings of pixels and two or three strings and below a cell for one- and two-pixel traps, respectively. With reference to FIG. 22, the Trapper processes the strings successively downwards through a cell.

Depending on the implementation approach, the neighboring strings above and below a cell, as well as the neighboring pixels to the left and right of a cell, must be either buffered on-chip, which requires greater on-chip memory, or re-fetched from system memory, which requires greater bandwidth.

System Buffering Requirements

The convolution analysis also affects system buffering of input data. In order for Trapper to properly convolve data at the top and bottom of a stripe, it must have access to neighboring scanlines from neighboring stripes. This is depicted in FIG. 21. For the first of stripe of a pane, there is no previous stripe, and for the last stripe of a pane, there is no next stripe. In these cases, the Trapper does not require a previous or next stripe, and instead assumes in its calculations that pixels above and below the first and last stripe of a pane—as well as pixels to the left and right of a stripe—are zero. The diagram illustrates the layout of image data in memory and shows a conceptual relationship between the current stripe being trapped, the previous stripe just trapped and the next stripe to be trapped.

With reference to FIG. 21, 21a are the last scanlines from the previous stripe—two scanlines for trap widths of 0.5 or 1 pixel, or three scanlines for trap widths of 1.5 or 2 pixels.

21b are first scanlines from the next stripe—two scanlines for trap widths of 0.5 or 1 pixel, or three scanlines for trap widths of 1.5 or 2 pixels.

21c is the end of stripe address for the previous stripe.

21d is the stripe address for the current stripe.

21d is the stripe address for the next stripe.

Note that in FIG. 21, full stripes are shown for the previous and next stripes. However, software implementation can be more flexible. For example, the previous 256-high stripe can be freed by copying just the last two or three scanlines to a temporary space. For the next stripe to be trapped, though, it is unlikely that the first two scanlines can be made available in advance of the entire stripe being composed and being ready for the color conversion, overlay, and trapping stages.

FIG. 22 shows the organization of cells and pixels within a subband and the order in which they are processed by a hardware trapper implementation. When the Trapper processes a cell, it requires neighboring pixels for the convolution calculations. A cell is 32 pixels wide and 32 pixels high, but 36- or 38-pixel strings and two or three strings above and below a cell are required for one and two-pixel traps, respectively. Depending on the implementation approach, neighboring strings above and below a cell, as well as neighboring pixels to the left and right of a cell, must be either buffered on-chip or re-fetched from system memory. The 2×2 or 3×3 corners of a swath of neighboring pixels are not needed by any convolution calculations but the implementation may read them anyway to simplify the logic.

Data Buffering inside Trapper

In general, trapping causes pixel values to be copied from the dark side of an edge to the lighter side. The trapping algorithm defines that only original pixel values are used during the processing to determine how to modify the image. It is important for Trapper to isolate input and output pixels. Image analysis (e.g., convolution, direction, trapping thresholds) is always performed on input pixels, and modification to an image is always performed on output pixels. Thus, Trapper hardware requires output buffering to maintain output pixels separate from input pixels.

Tag Plane Processing

Through particular section of the imaging pipeline from Color Converter to Trapper to Subband Compressor data in memory is reformatted from uncompressed planar bands to compressed planar subbands. The tag plane must also follow this transformation, so that the Rotator can easily rotate the tag plane as well as the color data. It will be understood that other factors in a particular implementation will determine whether this occurs in the Trapper module or the Subband Compressor Module.

Edge Detection by Convolution

For the case of two-pixel traps, once seven strings of pixels are buffered on-chip (using block SRAMs, for example), a Trapper module must read pixel data from the block SRAMs or other generally-understood storage mechanism to have matrices of pixels available for the up to nine convolutions (L1, L2, R1, R2, T1, T2, B1, B2, C) that it must perform. In a typical implementation these matrices consist of simple flops to allow parallel access to the data by up to nine convolution modules. This exemplary hardware implementation takes advantage of the use of the 1-4 Laplacian kernel in order to minimize logic size. No multipliers are necessary, but instead for each convolution function on each plane, only one shifter, two adders and one subtractor are required. One comparator is then necessary to compare the convolved value against a convolution threshold. The result of this comparison determines whether there is an edge or not on the given plane. This result in turn is compared against results from other planes, and if the directions of the edges are opposite to one another, then this edge is a candidate for trapping.

Determine Direction

Once the comparisons in the previous step are complete, it is a simple matter to check the sign of one of the two convolved pixels on one of the plane-pairs. Its sign determines what "direction" (light-to-dark versus dark-to-light) that both plane-pairs are heading.

Apply Trap Threshold

Once two coincident and opposite edges are found, trapping is performed only if the color difference on both planes is greater than the trapping threshold. Logically, this is implemented in a well-known way with two subtractors and a comparator for each plane in the pair, and ANDing the result together. A true output indicates that a trap is to be performed.

Generate Trap

Once the decision to trap is made, which pixel on which plane is converted from one code to the other must be determined by generally-understood means using the results from the "determine direction" step plus a simple 8-bit comparator. The result of this causes a pixel value to write over its neighbor.

Design Optimization

Figure 23:
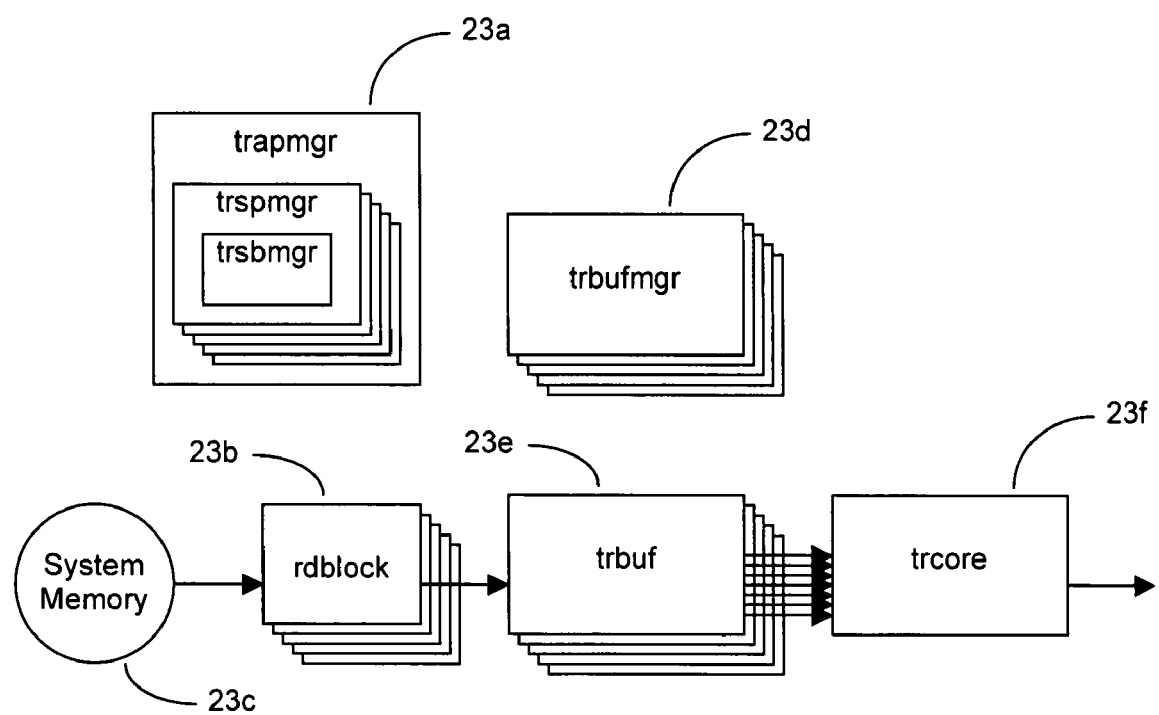
FIG. 23 is a block diagram for a hardware trapper.

It will be understood that Trapper hardware can be implemented in a variety of ways, such as that shown in the Trapper hardware block diagram, FIG. 23. A trapmgr block 23a divides a band into subbands and subbands into cells, and then issues a sequence of requests to the rdblock block, 23b, to fetch a full or partial cell from system memory, 23c. Cells within the subband as well as cells neighboring the subband are fetched. Each cell fetched by rdblock is stored by trbufmgr 23d in on-chip memory 23e one pixel at a time (per channel). The trbufmgr 23d also manages reading of seven rows of pixels from trbuf 23e to trcore, 23f, which performs the trapping algorithm. Details regarding trcore, 23f are described below with reference to FIG. 26.

The performance of a Trapper module can be assessed by two measures: processing throughput and I/O throughput. Processing throughput is the rate at which data can be processed through the Trapper pipeline, assuming no I/O limitations. I/O throughput is the rate at which data is read into and written out of Trapper's I/O ports, assuming no internal processor limitations. Also since the Trapper implementation re-fetches neighboring pixels, there is an inherent inefficiency, or overhead, which is analyzed below. However, note that this is a design tradeoff between the cost of bandwidth in the system and the cost of on-chip memory.

In order to process one composite pixel per clock, it will be understood that the Trapper design may require duplicate convolution and trapping logic blocks, as well as duplicate Relative Toner Density Lookup Tables and that pipelining may be required, all according to well-known methods. The convolution and trapping functions are composed of multi-level adder trees and followed by additional levels of comparators. Depending on the actual speed of the ASIC cell library, pipeline stages might have to be inserted.

Trapper Bandwidth Overhead

As discussed here, a Trapper performs its processing on neighborhoods of pixels. Also discussed is the fact that Trapper must sequence through rasters in a cellular order within a subband. These two requirements cause Trapper to require access to the same pixel more than once, as it processes one cell and then the next. Accessing a pixel more than once is called re-fetching, and the bandwidth requirements of the Trapper are affected by how much it has to re-fetch data, known as its bandwidth overhead factor, or $K_{OH}$.

Trapper bandwidth overhead can be improved by adding on-chip memory. Instead of re-fetching data, Trapper can fetch the data once, and then maintain it on-chip for use as required. However, given a goal of limiting major blocks, for example to not more than 8 Kbytes of memory, and given that the size of the data structures for Trapper's processing pipeline are on the order of cells and subbands, re-fetching is the preferred trade-off. Nevertheless, there are two practical design approaches: one that uses a minimum amount of additional on-chip memory, and one that uses more on-chip memory to reduce bandwidth. Ideally, a Trapper reads each pixel only once in an efficient burst cycle. For one subband, in the current example, this would amount to 256 bursts per column. However, due to re-fetching, the Trapper must fetch additional bursts. The analysis that follows determines how many bursts each respective approach needs to make to handle all fetches and re-fetches, and then compares these burst counts against the ideal, to compute the bandwidth overhead factors, $K_{OH}$. These $K_{OH}$ values are used in the subsequent section to determine total bandwidth requirements for the Trapper in this ASIC.

Figure 24:
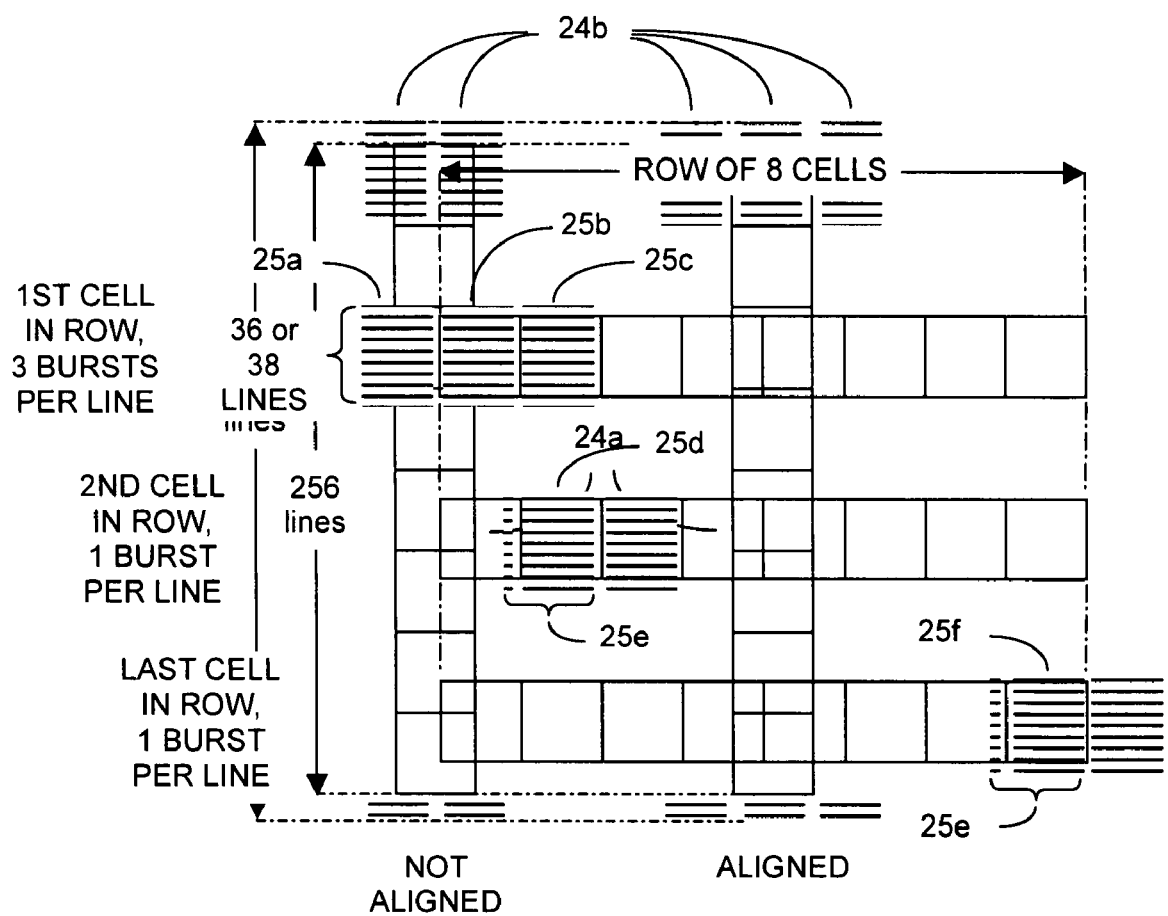
FIG. 24 shows data organization for a design approach which minimizes on-chip memory at the expense of greater bandwidth.

A first design approach requires minimal on-chip pixel processing memory, for example just 1,330 bytes (32 B/line×7 lines×5 planes) for all five planes, but it requires a large amount of bandwidth. For this design approach, a Trapper must read three additional strings above and three below each column of cells, as shown in FIG. 24. This amounts to 262 strings (256+6). In addition, each string is 38 bytes (pixels) long for two-pixel traps, which, given the operation of contemporary DDR RAM, requires two or three burst reads (instead of just one), depending on how the cells of a subband and stripe are aligned in memory relative to the DDR burst (cache-line) boundaries. So, 262 strings at two or three bursts per string amount to 524 or 786 bursts total per column of cells. Comparing this against the ideal of 256 bursts per column yields values of the bandwidth overhead factor ($K_{OH}$) of 2.05 best case, 3.07 worst case, and 2.31 on average. Each column of cells 24a processed by trapper hardware contains eight cells for a total of 256 lines of image data, but a trapper must read three strings of image data bytes above and three below the column or 262 of the lines. Each cell is 32 bytes wide and each string is 36 or 38 bytes long. The columns of image data are held in well-known DDR memory which has burst or cache-line boundaries 24b which are also 32 bytes wide and whose characteristic operation results in two burst reads per string if the column is more than 2 pixels out of alignment with the burst or cache-line boundaries for 36-byte strings or more than 3 pixels out of alignment for 38-byte strings. Closer alignment results in 3 burst reads per string.

Figure 25:
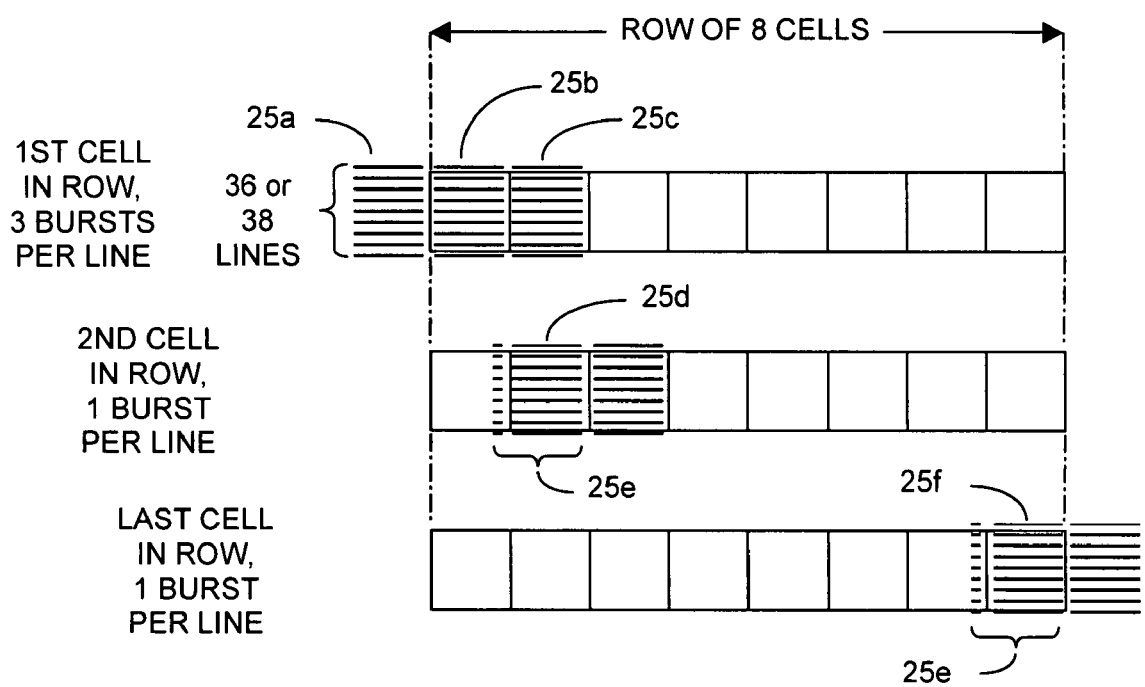
FIG. 25 shows a data organization for a design approach which uses more memory to reduce bandwidth requirements.

A second design approach for two-pixel traps requires more pixel processing memory, for example 12,730 bytes (67 B/line×38 lines×5 planes), to maintain two cells (plus neighboring pixels) on-chip, but in return cuts bandwidth by up to half. As shown in FIG. 25, this approach reads an extra set of three bursts at the top and bottom of each cell, but scanlines of cells are read only once, except at the edge of subband boundaries. The extra burst reads above and below each cell cause Trapper to read 38 bursts instead of 32 bursts per cell, which is an overhead of 38/32, or 1.1875×. In addition, Trapper must read ten cells across in order to process the middle eight, which results in an overhead of 10/8, or 1.25×. These must be multiplied together to yield a total overhead factor for this approach of $K_{OH}$=1.48. Trapping the first cell in a row (25b) requires cells 25a and 25c of neighboring pixels and therefore a total of 3 burst reads per line. Necessary strings 25e are retained in trapper logic. Consequently, for each of the other cells in a row from the $2^{nd}$ cell 25d up to the last cell 25f only one burst read per line is required.

The two design approaches may be compared for respective the bandwidth overhead factors of 3.07, the worst case value for the first design approach, and 1.48 respectively.

In an example implementation, each image plane contains 32 MB of data and the total for CMYT is 128 MB. For this example it is assumed that an average CMYKT compressed image contains 35 MB. With reference to FIG. 16 and assuming a system speed of one page per second, system bus bandwidth consumption can be calculated thus:

Input raw CMYT image 128 MB/s
Output compressed CMYK image 35 MB/s
Total net bandwidth 163 MB/s The actual bandwidth requirement is the net bandwidth multiplied by the bandwidth overhead factor. Therefore, the first design approach requires 163×3.07=500.4 MB/s and the second design approach requires 163×1.48=241.24 MB/s, the ratio being approximately 2:1 for the first design approach relative to the second design approach.

Note that in addition to the pixel processing memory, it will be understood that each of the design approaches requires additional memory for the Relative Toner Density look-up tables and, assuming the 32×32-pixel cell organization illustrated in FIG. 22, a 32-pixel string of pixels as an input buffer for each of the five planes CMYKT, namely 160 bytes. In this example the memory required for the Relative Toner Density look-up tables can be calculated thus:

(3 *CMK* planes)×(256 entries)×(1 byte/entry)×(5 copies)=3,840 bytes

Therefore the additional memory is 160+3,840=4,000 bytes and the total memory requirements for the first and second design approaches respectively are: 1,330+4,000=5,330 bytes and 12,730+4,000=16,730 bytes, the ratio being approximately 1:3.14.

Either of the design approaches as well as others with various well-understood tradeoffs between memory bandwidth and memory consumption may be taken for implementing the present invention depending on application requirements.

Figure 26:
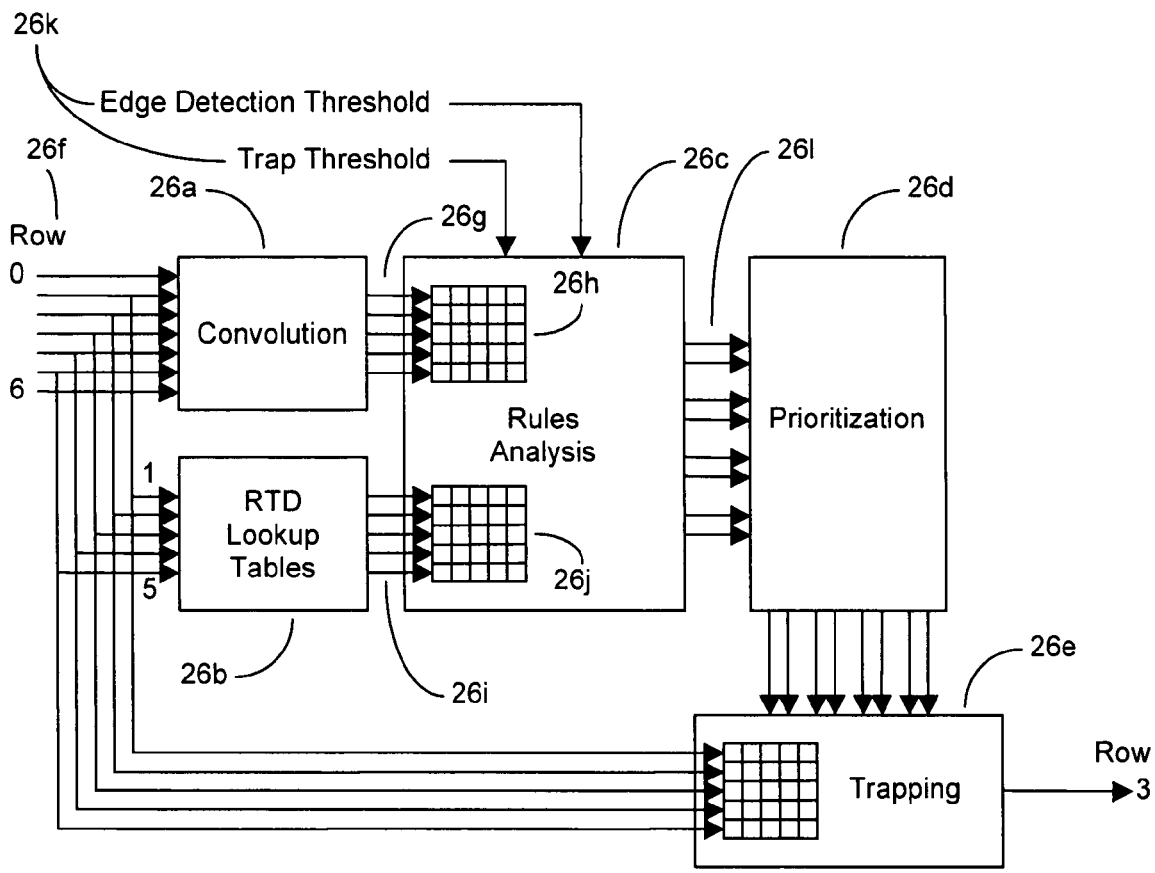
FIG. 26 is a block diagram of an example hardware implementation of Trapper Core (trcor) 23f shown in FIG. 23.

Referring now to FIG. 26, the Trapper Core Block (trcore, item 23f in FIG. 23) is a composite pixel processing pipeline that is divided into five sub-blocks: the Convolution Block (26a), the Relative Toner Density (RTD) Lookup Table Block (26b), the Rules Analysis Block (26c), the Prioritization Block (26d), and the Trapping Block (26e). Seven rows of composite pixels (26f) enter, and all seven rows go to the Convolution Block (26a), while the middle five rows go to the RTD Lookup Table Block (26b) and to the Trapping Block (26e). From the seven input rows, the Convolution Block calculates five convolution values (26g) which are stored in a matrix of convolution values (26h). In parallel with this, the RTD Lookup Table Block performs one-dimensional mapping of input values to relative toner density values (26i) which are stored in a matrix of RTD values (26j). The Rules Analysis Block can access individual matrix entries to analyze up to eight edges surrounding the center of the matrix. Programmable parameters (26k) including the edge detection threshold, trap threshold, yellow and attribute spreading mode and super black threshold are used in the Rules Analysis Block (26c) to control trapping analysis. The Rules Analysis Block (26c) outputs up to eight trapping requests (26l) which enter the Prioritization Block (26d). If there are multiple trap requests, the Prioritization Block (26d) selects which one of the requests should be honored, and asserts only one of the eight requests to the Trapping Block (26e). The Trapping Block (26e) buffers a matrix of input pixels, and based on a trapping request and a programmable trap width parameter copies none or one of eight pixels (or a calculated value in case of non-integer trap widths) to the center pixel, which is then output.

This is but one example of implementing the trapping algorithm in hardware. Implementation can vary to satisfy different requirements. The implementation above provides high performance by using identical hardware processing blocks and running them in parallel with one another. This provides high throughput while avoiding a requirement for large scanline buffers on-chip. Other implementations could reduce the size of the hardware by taking advantage of relaxed performance requirements, or by taking advantage of large scanline buffers.

The hardware shown in FIG. 26 can be further described in Verilog, a well-known hardware description language (HDL). For each of the C, M, and K planes, the Convolution Block (26a) performs five 1-4 Laplacian kernel convolutions in parallel. In one embodiment, this is implemented in a function named convolve 1×4, which is re-used 15 times in the Trapper Core Block. Each convolve 1×4 function operates on five unsigned 8-bit pixel inputs, named a01, a10, a11, a12, and a21, and produces a single 10-bit signed value that ranges from −1020 to +1020. The Verilog statement is convolve 1×4=a01+a10+a12+a21−(a11<<2);

This Verilog statement can synthesize to four adders for each of the 15 convolve 1×4 functions that are referenced in trcore.

For each of the C, M, and Y planes, the Relative Toner Density Lookup Table Block (26b) is composed of five 256×8 look-up tables, for a total of fifteen. These look-up tables can be implemented with flip flops, register arrays, or block RAMs. For slower applications the look-up tables can be implemented with system memory.

For a maximum trap width of two pixels, the Rules Analysis Block (26c) analyzes eight edges in parallel surrounding a given "center" pixel. In one implementation the edge analysis is embodied in a Verilog module named "analyzeedge" that is instantiated eight times corresponding to the eight edges. Each "analyzeedge" module takes a pair of C, M, and K convolution values from the Convolution Block (26a), and a pair of one-dimensionally mapped C, M, and K pixel values from the Relative Toner Density Lookup Table Block (26b), plus trapping algorithm controls, such as trapping thresholds and options, and produces a single 3-bit bitmask for the edge. Up to two of the three bits in the bitmask can be set by "analyzeedge" to identify which of up to two of the C, M and K planes should trap from the far side of an edge to the near side. This is a complex module that requires comparators and absolute functions that would be synthesized as a series of adders, multiplexers, inverters, and random discrete logic, including 8- and 10-bit adders.

The Prioritization Block (26d) takes the bitmask outputs of all eight instances of the analyzeedge module and prioritizes them so that only one of the eight edges is selected to have its far-side component pixels trapped into the "center" composite pixel. In one implementation, this prioritization is embodied in a series of if-then-else Verilog statements, which would be synthesized into discrete logic. The output of this logic is a decode of which of the eight edges should be trapped, and on that edge, which planes should be trapped.

In one embodiment, the final block, the Trapping Block (26e), is composed of eight sets of Verilog function references "trappix", one for each of the eight edges that may trap. Each set of "trappix" functions operates on each of the five planes in a composite pixel: C, M, Y, K, and A. Thus, there is a total of 8 edges×5 planes, or 40, "trappix" references. Each "trappix" function traps a single plane, and takes control inputs as well as 8-bit unsigned far and center pixels, and returns an 8-bit unsigned trapped pixel result, which is either the original far input pixel value, the original center input pixel value, or in the case of ½ and 1½ pixel trap widths, the average of the far and center pixel values. This averaging requires an 8-bit adder. Otherwise, "trappix" can be implemented with a Verilog case-statement, which can synthesize into multiplexers controlled by decode logic.

We claim:

1. A system for reducing visibility of registration errors in an image to be printed using a digital color printer, the image having cyan (C), magenta (M), yellow (Y), and black (K) color planes, each color plane having a plurality of respective C, M, Y and K pixels, said pixels used to form objects on said C, M, Y and K color planes, said system comprising:
   a) means for detecting colored edges of colored objects on each of the C, M and K color planes;
   b) means for detecting coincident and opposing edge transitions on CM, CK and KM color plane pairs:
   c) means for performing processing on the detected coincident and opposing edge transitions to determine the color plane and direction to extend the objects, if necessary;
   d) means for spreading or choking the objects across the determined color plane using a simple trap generation rule and a single trap generation rule wherein said means for spreading or choking using said single trap generation rule comprises, with respect to first and second color planes, if there are extensions on both sides of the color edge, determining which two colorants will generate said extensions and, determining which of the two extensions is darker and generating the darker extension, wherein said means for detecting said edges of objects comprises:
   means for measuring spatial rates of change of color value and comparing the color values across the edges against at least two thresholds on each color plane independent of other color planes using a Laplacian kernel for each pixel in the color plane,
   wherein said means for performing processing to determine the color plane and direction to extend the objects comprises:
   means for comparing convolved pixel values for each edge of each color plane, wherein said convolved pixel values are obtained by performing a convolution calculation for each pixel in each of said color planes; and wherein said means for spreading or choking comprises nine convolution matrices, wherein the nine convolution matrices include up to nine convolution modules in a hardware implementation to allow parallel access to image data, wherein the hardware implementation uses a 1-4 Laplacian kernel, including one shifter, two adders, one subtractor and, one comparator for each convolution module, wherein the comparator compares a convolved pixel value against a convolution threshold, to determine whether there is an edge or not on for each color plane, and the result is compared with the results from other planes, and the edge is a candidate for trapping if the directions of the determined edges are opposite to one another, wherein the nine convolution matrices include up to nine convolution modules in a hardware implementation to allow parallel access to image data, wherein the hardware implementation uses a 1-4 Laplacian kernel, including one shifter, two adders, one subtractor and, one comparator for each convolution module, wherein the comparator compares a convolved pixel value against a convolution threshold, to determine whether there is an edge or not on for each color plane, and the result is compared with the results from other planes, and the edge is a candidate for trapping if the directions of the determined edges are opposite to one another.

2. The system defined by claim 1 wherein said means for detecting coincident and opposing edge transitions comprises:
  means for comparing look-up table values of opposite edges of each of said C, M and K color plane pairs with predetermined threshold, said look-up table values corresponding to C, M and K toner density, respectively.

3. The system defined by claim 2 herein said comparing means uses sequential testing to determine if a current pixel will generate a trap, and if no trap will be generated, skipping remaining tests.

4. The system defined by claim 1 wherein said means for spreading or choking using said simple trap generation rule comprises, with respect to first and second color planes,
  i) if a look-up table pixel value on a right side edge of the first color plane is greater than a look-up table pixel value on a left side edge of the second color plane, logic to extend a corresponding second color plane pixel from left to right,
  ii) if a look-up table pixel value on a right side edge of the first color plane is not greater than a look-up table pixel value on a left side edge of the second color plane, logic to extend a corresponding first color plane pixel from right to left,
  iii) if a look-up table pixel value on a left side edge of the first color plane is greater than a look-up table pixel value on a right side edge of the second color plane, logic to extend a corresponding second color plane pixel from right to left,
  iv) if a look-up table pixel value on a left side edge of the first color plane is not greater than a look-up table pixel value on a right side edge of the second color plane, logic to extend a corresponding first color plane pixel from left to right.

5. The system defined by claim 1, wherein said means for spreading or choking using said single trap generation rule ensures that traps are generated on only one side of a color edge.

6. The system defined by claim 1 wherein said means for spreading or choking operates to provide trap widths of 0.5, 1, 1.5 and 2 pixels.

7. A method for reducing visibility of registration errors in an image to be printed using digital color printer, the image having cyan (C), magenta (M), yellow (Y), and black (K) color planes, each color plane having a plurality of respective C, M, Y and K pixels, said pixels used to form objects on said C, M, Y and K color planes, said method comprising:
  a) detecting colored edges of objects on each of the C, M and K color planes;
  b) detecting coincident and opposing edge transitions on CM, CK and KM color plane pairs;
  c) performing processing on the detected coincident and opposing edge transitions to determine the color plane and direction to extend the objects;
  d) spreading or choking the objects across the determined color plane using a simple trap generation rule and a single trap generation rule, wherein said detecting said edges of objects comprises:
  measuring spatial rates of change of color value and comparing the color values across the edges against at least two thresholds on each color plane independent of other color planes using a Laplacian kernel for each pixel in the color plane,
  wherein said performing processing to determine the color plane and direction to extend the objects comprises:
  comparing convolved pixel values for each edge of each color plane, wherein said convolved pixel values are obtained by performing a convolution calculation for each pixel in each of said color planes using nine convolution matrices, wherein the nine convolution matrices include up to nine convolution modules allowing parallel access to image data, using a 1-4 Laplacian kernel, including a comparator for each convolution module,
  wherein the comparator compares a convolved pixel value against a convolution threshold, to determine whether there is an edge or not on for each color plane, and the result is compared with the results from other planes, and the edge is a candidate for trapping if the directions of the determined edges are opposite to one another.

8. The method defined by claim 7 wherein said detecting coincident and opposing edge transitions comprises:
  comparing look-up table values of opposite edges of each of said C, M and K color plane pairs with a predetermined threshold, said look-up table values corresponding to C, M and K toner density, respectively.

9. The method defined by claim 7 wherein said spreading or choking using said simple trap generation rule comprises, with respect to first and second color planes,
  i) if a look-up table pixel value on a right side edge of the first color plane is greater than a look-up table pixel value on a left side edge of the second color plane, extending a corresponding second color plane pixel from left to right,
  ii) if a look-up table pixel value on a right side edge of the first color plane is not greater than a look-up table pixel value on a left side edge of the second color plane, extending a corresponding first color plane pixel from right to left,
  iii) if a look-up table pixel value on a left side edge of the first color plane is greater than a look-up table pixel value on a right side edge of the second color plane, extending a corresponding second color plane pixel from right to left, iv) if a look-up table pixel value on a left side edge of the first color plane is not greater than a look-up table pixel value on a right side edge of the second color plane, extending a corresponding first color plane pixel from left to right.

10. The method defined by claim 7, wherein said spreading or choking using said single trap generation rule ensures that traps are generated on only one side of a color edge.

* * * * *

UNITED STATES PATENT AND TRADEMARK OFFICE
CERTIFICATE OF CORRECTION

PATENT NO. : 8,199,359 B2  
APPLICATION NO. : 11/789206  
DATED : June 12, 2012  
INVENTOR(S) : Lakhbir Gandhi et al.

Page 1 of 1

It is certified that error appears in the above-identified patent and that said Letters Patent is hereby corrected as shown below:

In the Claims, Column 27, Claim 3, line 37, please delete "herein" and insert --wherein--.

Column 28, Claim 7, line 35, please delete "1-4Laplacian" and insert --1-4 Laplacian--.

Signed and Sealed this  
Twenty-fifth Day of December, 2012

David J. Kappos  
*Director of the United States Patent and Trademark Office*